US010870912B2

(12) United States Patent
Zimmerman et al.

(10) Patent No.: US 10,870,912 B2
(45) Date of Patent: Dec. 22, 2020

(54) METHOD FOR USING BORONIZING REACTION GASES AS A PROTECTIVE ATMOSPHERE DURING BORONIZING, AND REACTION GAS NEUTRALIZING TREATMENT

(71) Applicant: BWT LLC, Greenville, SC (US)

(72) Inventors: Craig Zimmerman, Oak Creek, WI (US); Jim Hedman, Tennyson, IN (US); Nick Bugliarello-Wondrich, St. Charles, IL (US); Jeff Hemmer, Indianapolis, IN (US)

(73) Assignee: BWT LLC, Greenville, SC (US)

( * ) Notice: Subject to any disclaimer, the term of this patent is extended or adjusted under 35 U.S.C. 154(b) by 331 days.

(21) Appl. No.: 15/918,198

(22) Filed: Mar. 12, 2018

(65) Prior Publication Data
US 2018/0265959 A1 Sep. 20, 2018

Related U.S. Application Data

(60) Provisional application No. 62/471,157, filed on Mar. 14, 2017.

(51) Int. Cl.
C23C 8/70 (2006.01)
F16L 9/02 (2006.01)
(Continued)

(52) U.S. Cl.
CPC ............. *C23C 8/70* (2013.01); *B01J 20/043* (2013.01); *B01J 20/08* (2013.01); *C23C 8/00* (2013.01);
(Continued)

(58) Field of Classification Search
CPC ... C23C 8/70; B01J 20/043; F16L 9/02; F16L 57/06; F16L 58/04
See application file for complete search history.

(56) References Cited

U.S. PATENT DOCUMENTS 3,806,374 A 4/1974 Krzyminski
3,809,583 A 5/1974 Krzyminski
(Continued)

FOREIGN PATENT DOCUMENTS

CN 1275637 A 12/2000
CN 101487110 A 7/2009
(Continued)

OTHER PUBLICATIONS

PCT International Search Report and Written Opinion dated Jun. 7, 2018 from Application No. PCT/US2018/021923, 14 pages.
(Continued)

Primary Examiner — Christopher S Kessler
Assistant Examiner — Jiangtian Xu
(74) Attorney, Agent, or Firm — Dilworth IP, LLC

(57) ABSTRACT

A process comprising:
  placing a boronizing powder composition in the interior of a metal pipe comprising a first end, a second end, an inside surface and an outside surface;
  heating the pipe in a vessel having an interior, to a temperature from 1400° F. to 1900° F., thereby forming spent boronizing reaction gases and a borided layer on the inside surface,
    wherein the vessel interior has an atmosphere that surrounds the outside surface of the metal pipe; and
  flowing the spent boronizing reaction gases into the atmosphere surrounding the outside surface of the pipe, thereby forming an oxygen-depleted atmosphere.

39 Claims, 14 Drawing Sheets

(51) Int. Cl.

| | |
|---|---|
| *F16L 57/06* | (2006.01) |
| *F16L 58/04* | (2006.01) |
| *B01J 20/04* | (2006.01) |
| *B01J 20/08* | (2006.01) |
| *C23C 8/80* | (2006.01) |
| *C23C 8/68* | (2006.01) |
| *C23C 8/06* | (2006.01) |
| *C23C 8/00* | (2006.01) |
| *C23C 8/08* | (2006.01) |
| *C23C 8/02* | (2006.01) |
| *C01B 35/06* | (2006.01) |
| *C01B 32/20* | (2017.01) |
| *C01B 32/956* | (2017.01) |
| *C01B 32/991* | (2017.01) |
| *C01B 35/02* | (2006.01) |

(52) U.S. Cl.
CPC .............. *C23C 8/02* (2013.01); *C23C 8/06* (2013.01); *C23C 8/08* (2013.01); *C23C 8/68* (2013.01); *C23C 8/80* (2013.01); *F16L 9/02* (2013.01); *F16L 57/06* (2013.01); *F16L 58/04* (2013.01); *C01B 32/20* (2017.08); *C01B 32/956* (2017.08); *C01B 32/991* (2017.08); *C01B 35/023* (2013.01); *C01B 35/066* (2013.01)

(56) References Cited

U.S. PATENT DOCUMENTS

| | | | |
|---|---|---|---|
| 3,936,327 | A | 2/1976 | Fichti et al. |
| 4,126,488 | A | 11/1978 | Kunst et al. |
| 4,172,162 | A | 10/1979 | Danzey |
| 4,217,141 | A | 8/1980 | Schrittwieser |
| 4,289,545 | A | 9/1981 | Thevenot et al. |
| 4,348,980 | A | 9/1982 | Thevenot et al. |
| 4,404,045 | A | 9/1983 | Thevenot et al. |
| 4,637,837 | A | 1/1987 | Von Matuschka et al. |
| 5,455,068 | A | 10/1995 | Aves et al. |
| 6,245,162 | B1 | 6/2001 | Baudis et al. |
| 6,478,887 | B1 | 11/2002 | Sue et al. |
| 6,503,344 | B2 | 1/2003 | Baudis et al. |
| 7,264,682 | B2 | 9/2007 | Chandran et al. |
| 8,012,274 | B2 | 9/2011 | Skaff |
| 8,187,393 | B2 | 5/2012 | Zlatev et al. |
| 8,316,679 | B2 | 11/2012 | Fiorucci et al. |
| 8,894,770 | B2 | 11/2014 | Carlisle |
| 8,974,857 | B2 | 3/2015 | Yoon et al. |
| 2009/0293993 | A1* | 12/2009 | Zlatev .................. C09D 1/00 148/279 |
| 2010/0018611 | A1 | 1/2010 | Timur et al. |
| 2013/0243955 | A1* | 9/2013 | Carlisle .................. C23C 16/38 427/248.1 |
| 2014/0096858 | A1* | 4/2014 | Nam .................. C22C 38/34 138/145 |
| 2015/0225834 | A1 | 8/2015 | Pham et al. |
| 2016/0108512 | A1 | 4/2016 | Medvedovski |
| 2016/0298211 | A1* | 10/2016 | Bergeron .............. C22B 60/0208 |

FOREIGN PATENT DOCUMENTS

| | | |
|---|---|---|
| CN | 102154616 A | 8/2011 |
| CN | 104032311 A | 9/2014 |
| EP | 1026282 B1 | 3/2003 |
| GB | 950767 A | 2/1964 |
| IN | 1369/DEL/1999 | 3/2007 |
| JP | 2000119839 A | 4/2000 |
| WO | 2008/100155 A1 | 8/2008 |

OTHER PUBLICATIONS

PCT International Search Report and Written Opinion dated Jun. 1, 2018 from Application No. PCT/US2018/021925, 5 pages.
PCT Invitation to Pay Additional Fees and Partial Search Results mailed Jun. 11, 2018 from Application No. PCT/US2018/021971, 20 pages.
Zimmerman, Adv. Mater. & Proc., Sep. 2016, 2 pages.
Zimmerman, ASM Handbook, vol. 4A, Steel Heat Treating Fundamentals and Processes, 2013, 16 pages.
Akkurt et al., "The Radiation Shielding Properties of Boronized Vanadium Steels", 3 pages, downloaded on Jan. 9, 2014.
Alimov, Pharm. Chem. Journal, May 1975, vol. 9(5) 324-336.
Alberta Innovates—Technology Futures, Laboratory Test Report, Nov. 30, 2012, 4 pages.
Carbucicchio et al., Hyperfine Interactions, 69 (1991) 843-846.
Dearnley, Surface Engineering, 1985, vol. 1, No. 3, 15 pages.
Hernandez et al., Adv. in Mater. Science and Eng., vol. 2014, Article ID 249174, 9 pages.
HTS ASM International, Nov.-Dec. 2014, vol. 2, Issue 4, 16 pages.
Lin et al., Int. J. Electrochem. Sci., 10 (2015) 2694-2706.
Medvedovski et al., Adv. Eng. Mater., 2014, 16, No. 6, 713-728.
Medvedovski et al., Adv. Eng. Mater., 2016, 18, No. 1, 11-33.
Medvedovski et al., Ceramics International 42 (2016) 3190-3211.
Osborne et al., Oak Ridge Nat'l Library, UT-Battelle, LLC, US Dept. of Energy, Aug. 2000, 33 pages.
EndurAlloy Tubing, Endurance Technologies Inc., 2012 Sucker Rod Pumping Workshop, 4 pages.
Garza et al., West Texas Case Study 2009, 7 pages.
"A Strong Investment EndurAlloy™ Production Tubing", promotional material downloaded from www.endurancetechnologies.com on Mar. 21, 2016.
"EndurAlloy Tubing", promotional material downloaded from www.endurancetechnologies.com on Mar. 21, 2016.
U.S. Appl. No. 15/918,045, filed Mar. 12, 2018.
U.S. Appl. No. 15/918,560, filed Mar. 12, 2018.
Examination Report issued in Canadian Patent Application No. 2998048, dated May 28, 2020, 5 pages.

* cited by examiner

Loading of larger retort and test tubes before boriding

Bright unscaled tubes after boriding that ran inside retort protected by spent boriding reaction gases that ran in air outside the retort

METHOD FOR USING BORONIZING REACTION GASES AS A PROTECTIVE ATMOSPHERE DURING BORONIZING, AND REACTION GAS NEUTRALIZING TREATMENT

FIELD OF THE INVENTION

The invention relates to boronizing processes for metal articles. More particularly, the invention relates to using reaction gases produced during the boronizing process as a protective atmosphere to prevent oxidation of metal article surfaces, and prevent sintering/caking of boronizing powders, along with the treatment methods and equipment designed to neutralize boronizing reaction gases, and reduce the volume of halide gas emissions being released into the environment.

BACKGROUND OF THE INVENTION

Treating metal surfaces is sometimes necessary when the targeted application for the metal workpiece subjects the metal to high wear, erosion or corrosion. For example, metal parts in agricultural equipment are sometimes treated to successfully withstand the erosive demands required during their normal use. Even more demanding applications involve both erosion and corrosion. Such an application is embodied in the oil and gas industry where deep wells are involved. In oil/gas drilling, a sucker rod pump can be used to pump desired products to the surface for recovery. The pump functions from the surface by oscillating a sucker rod up and down inside a pipe that drives a pump located at the bottom of the well. Each upward stroke of the pump transports liquid containing the targeted product up through a tube towards the surface. But such environments can be very harsh, with temperatures of 250° C. and pressures of 70 MPa or higher, not being uncommon. The presence of sour crude in the well also means corrosive compounds such as hydrogen sulfide, carbon dioxide, methane, produced water, produced crude and acidic conditions will be present. Under the best of circumstances, these conditions alone would represent a challenge to a pipe operating in such a service, however, the action of the sucker-rod pump complicates it still further, since the rod can wear against the inside surface of the pipe as it moves up and down. This mechanism of wear removes a portion of the metal tubing's surface layer, exposing the underlying layer to corrosion. This wear is even further accelerated by the presence of abrasive sand particles also being present in the crude oil being pumped. However, the newly corroded layer cannot protect the pipe from further corrosion since it is swiftly worn away by the continued action of the pump rod. Thus, an undesirable, repetitive cycle of erosion/corrosion/erosion takes place that can rapidly cause the pipe to fail. Since environmental concerns in recent years have pushed drilling rigs into deep water, further away from coastlines, the implications of pipe failure are very serious. Thus, drillers have preferred treated pipe for drilling applications, particularly, the diffusion-based treatments such as nitriding, carburizing and boriding. However, while nitriding and carburizing can produce hard metal surfaces, they do not harden as well as boronizing, which creates a wear layer with higher hardness than many wear resistant thermal spray coatings, such as tungsten carbide and chrome carbide. The boron is not mechanically bonded to the surface, but instead is diffused below the surface of the metal, making it less prone to delamination, peeling and breaking off treated parts. Just as importantly, these other methods cannot provide the corrosion resistance that boronizing offers.

Several methods for boronizing metal articles are available. For example, liquid boriding techniques can be employed, where electrolytic or electroless baths are employed to deposit layers of borides. Gas boriding or plasma boriding can also be used. However, these methods, while having certain advantages, are unsuitable for environmental reasons or are impractical for long tubing. Paste-boriding is a particular type of selective boriding, where the boronizing composition is applied as a paste to the metal surface, and then heated. This technique, while being useful for localized spot boriding, is completely unsuitable for pipes because there is no practical way of applying the paste through the length of the pipe. Powder pack boronizing, typically referred to as "pack cementation" boronizing, involves placing a metal part in physical contact with the boron source as part of the boronizing powder composition. For example, a metal part can be buried in a quantity of powder, or a pipe can be filled with powder so it contacts the pipe's interior surface, and the pipe is heated.

Powder boronizing compositions typically contain a boron source, an activator, and often a diluent, where reactive boron-containing compounds such as amorphous boron, crystalline ferroboron, boron carbide ($B_4C$), calcium hexaboride ($CaB_6$), or borax react with a halide-based activator upon heating to form gaseous boron trihalides, such as $BF_3$ or $BCl_3$, which reacts with the metal surface to deposit boron on the surface. Boron is then able to diffuse into the metal structure. Various diluents are included to provide bulk and reduce cost.

A challenge facing producers of borided pipes is that at the high furnace temperatures required, the presence of oxygen in the atmosphere contacting the outside of the pipe can oxidize and scale the outside surfaces of the tubing that is not protected by submersion in boronizing powders. This iron-oxide scale that forms will then peel and flake off the outer surfaces of the pipes, causing loss of wall thickness which will negatively affect the burst pressure and strength of the pipe. Oxygen can be present in gas direct-fired furnaces or furnaces that are not sealed, and were not designed to operate with a protective atmosphere, or in sealed furnaces that have deteriorated in performance so that air-leaks are present. This oxidation scaling can reach a point where it affects the structural integrity of the pipe itself, which is a significant consideration in view of the targeted application of these pipes in oil and gas drilling. It is possible to purge the furnace with nitrogen and/or mixtures of other inert gases, or place the pipe in a retort vessel that is purged with an inert gas to prevent scaling of the outer diameter of the pipe, however, this requires large amounts of inert gas and may not be practical or cost-effective. Boronizing reaction gases also can form silica ($SiO_2$) which can lead to silica glass forming on the boronizing containers, tooling, and internal furnace components, which can be detrimental to the furnace integrity and operation, and also lead to more periodic expensive furnace rebuilds. Moreover, the exposure of operations personnel to boronizing reaction gases is an operational hazard. It has unexpectedly been found that it is possible to use boronizing gases to create an inert atmosphere that can protect the outside of a metal pipe to prevent oxidation of its outside surface.

Other metal articles besides pipes that are selectively borided, such as paste borided components or components only partially submerged into a boriding powder pack also have bare metal surfaces exposed to furnace gases that are not coated in boronizing pastes or submerged in boronizing powders to protect them and prevent oxidation and scaling. Inert gases such as nitrogen and argon have been used as a protective atmosphere to prevent scaling oxidation of any exposed surfaces not being boronized. A new method has been developed to prevent scaling and oxidation of these surfaces using boronizing reaction gases as a protective atmosphere in lieu of using inert gases such as nitrogen and argon.

New methods and equipment for neutralizing reaction gases have also been developed to prevent glass formation in the furnace and reduce halide gas emissions into the furnace atmosphere and working environment to minimize environmental concerns associated with boronizing.

SUMMARY OF THE INVENTION

In one embodiment, the subject matter of the present disclosure relates to a process comprising placing a boronizing powder composition in the interior of a metal pipe comprising a first end, a second end, an inside surface and an outside surface. The pipe is then heated in a vessel having an interior, to a boriding temperature, thereby forming spent boronizing reaction gases and a borided layer on the inside surface, where the vessel interior has an atmosphere that surrounds the outside surface of the metal pipe. Finally, the spent boronizing reaction gases are flowed into the atmosphere surrounding the outside surface of the pipe, thereby forming an oxygen-depleted atmosphere.

In another embodiment, the subject matter of the present disclosure relates to a process comprising placing a boronizing powder composition in a metal pipe comprising a first end, a second end, an inside surface and an outside surface, heating the pipe to a boriding temperature, thereby forming a borided layer on the inside surface and generating spent boronizing reaction gases, and purging the spent boronizing reaction gases from the metal pipe with a gas.

In still another embodiment, the subject matter of the present disclosure relates to a metal pipe produced by a process comprising placing a boronizing powder composition in the interior of a metal pipe comprising a first end, a second end, an inside surface and an outside surface. The pipe is then heated in a vessel having an interior, to a boriding temperature, thereby forming spent boronizing reaction gases and a borided layer on the inside surface, where the vessel interior has an atmosphere that surrounds the outside surface of the metal pipe. Finally, the spent boronizing reaction gases are flowed into the atmosphere surrounding the outside surface of the pipe, thereby forming an oxygen-depleted atmosphere.

In another embodiment, the subject matter of the present disclosure relates to a process comprising pumping oil or natural gas to the surface using a metal pipe produced by a process comprising placing a boronizing powder composition in the interior of a metal pipe comprising a first end, a second end, an inside surface and an outside surface. The pipe is then heated in a vessel having an interior, to a boriding temperature, thereby forming spent boronizing reaction gases and a borided layer on the inside surface, where the vessel interior has an atmosphere that surrounds the outside surface of the metal pipe. Finally, the spent boronizing reaction gases are flowed into the atmosphere surrounding the outside surface of the pipe, thereby forming an oxygen-depleted atmosphere.

In still another embodiment, the subject matter of the present disclosure relates to a process comprising placing a boronizing powder composition in the interior of a metal pipe comprising a first end, a second end, an inside surface and an outside surface, heating the pipe in a vessel having an interior, to a boriding temperature, thereby forming spent boronizing reaction gases and a borided layer on the inside surface, and flowing the spent boronizing reaction gases into a reaction chamber.

In another embodiment, the subject matter of the present disclosure relates to process comprising placing a boronizing powder composition in the interior of a metal pipe comprising a first end, a second end, an inside surface and an outside surface, heating the pipe in a vessel having an interior, to a boriding temperature, thereby forming spent boronizing reaction gases and a borided layer on the inside surface, wherein an atmosphere of the vessel surrounds the outside surface of the metal pipe. Then the spent boronizing reaction gases are flowed into the atmosphere surrounding the outside surface of the pipe, thereby forming an oxygen-depleted atmosphere stream. Finally, the oxygen-depleted atmosphere stream is flowed to a reaction chamber.

In still another embodiment, the subject matter of the present disclosure relates to a process comprising placing boronizing powder and a metal workpiece in a first container, boronizing the metal workpiece in a furnace, thereby forming spent boronizing gases, and flowing the spent boronizing gases through absorbent material prior to release into the furnace or the environment.

BRIEF DESCRIPTION OF THE DRAWINGS

The subject matter of the present disclosure will be more fully understood from the following detailed description, taken in connection with the accompanying drawings, in which.

DETAILED DESCRIPTION OF THE INVENTION

Figure 1:
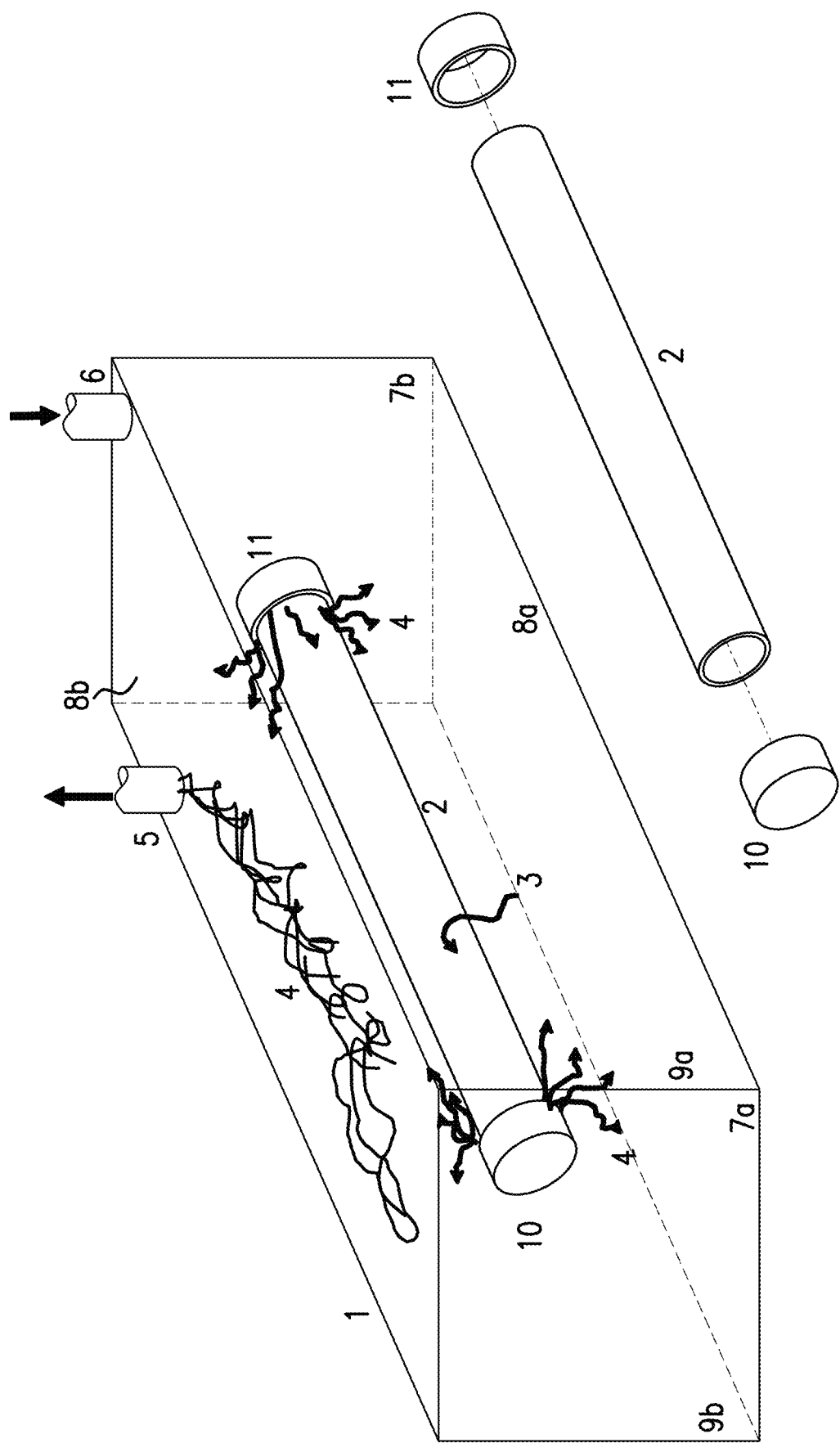
FIG. 1 illustrates a process where boronizing reaction gases are released from a pipe during boronizing and are directed to the atmosphere surrounding the pipe.

The subject matter of the present disclosure provides a process for boronizing metal articles, including pipes in an environmentally safe and efficient manner.

In one embodiment, the subject matter of the present disclosure relates to a process comprising placing a boronizing powder composition in the interior of a metal pipe comprising a first end, a second end, an inside surface and an outside surface. The pipe is then heated in a vessel having an interior, to a temperature from 1400° F. to 1900° F., thereby forming spent boronizing reaction gases and a borided layer on the inside surface, where the vessel interior has an atmosphere that surrounds the outside surface of the metal pipe. Finally, the spent boronizing reaction gases are flowed into the atmosphere surrounding the outside surface of the pipe, thereby forming an oxygen-depleted atmosphere.

For the purpose of this specification, the terms "boronizing" and "boriding;" and "boronized" and "borided" will be used interchangeably to designate the boronizing process and boride layers resulting from the process of the present subject matter. Also, the terms "pipe" and "tubing" will be used interchangeably to designate a cylindrical or round-shaped conduit for carrying fluids such as gases, liquids, slurries or powdered solids. When reference is made to the diameter of a tube or pipe, unless it is designated differently, it will mean the inside diameter of the tube or pipe.

Metal Articles

The metal articles to be boronized can be any components needing to be borided to improve wear resistance, corrosion resistance and/or surface hardness. Preferably, the components for boronizing treatments are agricultural machine parts, pump components, valve components, pipes, tubes, and elbows, ground engaging tools, spray nozzles and orifices, tools and dies, and many other possible components.

Metal Pipes

The metal pipes or tubes to be boronized preferably have an inner diameter (ID) of 1.0 to 12.0 inches. More preferably, the pipe has an ID of 1.5 to 6.0 inches. Most preferably, the pipe has an ID of 1.5 to 3.0 inches. The outside diameter of the pipe can vary depending on the pressure rating of the pipe that can require different wall thicknesses. The pressure rating of the pipe to be boronized can range from atmospheric to 5500 psia. The length of the pipe can vary. Preferably, the length of pipe can range from 1.0 to 36.0 feet. More preferably, the length of the pipe can range from 10.0 to 36.0 feet. Most preferably, the length of the pipe can range from 14.0 to 18.0 feet. Alternately, the length of the pipe can range from 31.0 to 36.0 feet. When subjected to a boronizing process, the metal article being boronized, whether a small article or a long pipe, is sometimes referred to as a "workpiece."

Metals

The metals to be boronized according to the process of the current subject matter are generally any that can be boronized. Preferably, the metal article is selected from plain carbon steel, alloy steel, tool steel, stainless steel, nickel-based alloys, cobalt-based alloys, cast iron, ductile iron, molybdenum, or stellite. More preferably, the metal to be boronized are ferrous materials such as plain carbon steels, alloy steels, tool steels, and stainless steel.

Boronizing Process

In the boronizing process for smaller size components where all surfaces must be borided, the metal articles to be treated are placed inside a powder pack container such as a round pot with a bottom, side walls and an open top; or a rectangular box with bottom and four side walls. These powder pack containers may then be placed inside a larger completely or partially sealed vessel, sometimes known as retorts. The purpose of a retort is to surround the boronizing powder pack containers with a different atmosphere gas composition that is generated within the retort or injected into the retort from an external gas source, and this gas composition is different than the atmosphere gas composition present in the furnace. The use of retorts is desired when the furnace gas atmosphere may not be compatible with the boriding process. These powder pack containers may also be processed outside of a retort with direct exposure to the furnace atmosphere if that furnace atmosphere will not have a negative effect on the boriding process. The powder pack containers are filled with boronizing powder such that the metal articles to be treated are completely buried under boronizing powders. During filling, the powder and containers may be vibrated to allow for powder to settle and completely fill the entire volume of the container. The surfaces of the metal articles to be boronized must be in physical contact with the boronizing powder in order for a boride layer to form on the metal article surfaces. Once filled, these powder pack containers with boronizing powder and metal articles inside them may be placed directly into the furnace, or else the containers may be placed inside a larger size, semi-sealed retort which is then loaded into the furnace. The sealed retort may be equipped with a gas inlet and gas outlet port. Inert gases such as nitrogen, argon, helium and others may be used to create an inert, non-oxidizing, protective atmosphere inside the retort to prevent sintering and oxidation of the boronizing powders, along with scaling and oxidation of containers. The gas outlet allows for spent boronizing gases and inert gases to exhaust from the retort, which can become pressurized during gas expansion from heating and evolution of halide gases from the solid halide activator chemicals present in the boronizing powder. The gas outlet also allows for these gases to be directed into a desired location.

In the boronizing process for the inner surface of a metal pipe, according to the present subject matter, the pipe is first capped on one end, and the pipe is filled with the boronizing powder. The cross section of the pipe must be completely filled with powder in the interior of the pipe intended to be boronized, i.e., there must be physical contact between the solids and the interior (inside) surface of the pipe during the boronizing. The cap can be a metal fitting with the appropriate valving or for example, high temperature ceramic fiber cloth or metallic gauze or foils that are fastened in place across the end of the pipe to prevent the movement or spillage of boronizing powder. Once the pipe is filled, a second metal end cap or additional high temperature ceramic fiber cloth can be attached, inserted or wrapped around the other end of the pipe, again to prevent movement and spillage of the powder inside the pipe. During filling, the powder can be densified by conventional techniques such as tapping or vibrating the pipe to aid the powder settling which can help ensure the pipe will be completely filled during the high temperature processing. Once filled with boronizing powder, the metal pipe can either be placed directly in a heating vessel such as a furnace, or first positioned inside a retort and then placing the retort in the furnace.

The retort is typically constructed of high temperature resistant materials such as nickel-based superalloys, stainless, or ceramic materials to prevent it from warping or changing size during multiple exposures to high temperature cycles. The retort can be equipped with inlet and outlet nozzles to allow gas input from outside the retort, e.g., air or inert gases, and to direct the flow of gas exiting the retort. The vessel in which the metal part is boronized can either be the furnace itself, or a container or retort that houses the metal part. The atmosphere inside the vessel surrounds and contacts the surface of the metal part to be boronized unless it is covered with powder, e.g., the outside surface of the pipe when the interior of the pipe is filled with boronizing powder. At typical furnace temperatures, the presence of ambient levels of oxygen can cause oxidation and scaling of the outside surface of the pipes during the boronization process. Preferably, the oxygen-depleted atmosphere contains less than 5% oxygen in order to reduce the rate of oxidation of the external surfaces of the boronizing containers and any other exposed metal surfaces along with preventing oxidation of the boronizing powder which may cause it to sinter and cake into a solid.

Once the furnace is loaded, it is heated to achieve a boronizing layer to 1400 to 1900° F., i.e., a boriding temperature. Preferably, the metal articles or metal pipes are heated to 1500 to 1750° F. The metal articles or metal pipes are typically heated for 1 to 24 hours. Preferably, the metal articles or metal pipes are heated from 4 to 16 hours. The types of furnaces used include either open fire or atmosphere controlled furnaces that are generally either batch, continuous roller hearth, carbottom, or pusher-type furnaces.

In one embodiment, the containers filled with metal articles and boronizing powder are positioned inside a retort that is placed inside a furnace. As the boronizing reactions proceed, the reaction gases exit the powder packs and are directed to and mix with the atmosphere inside the retort. Boronizing reaction gases resulting from the boronizing process can include hydrofluoric acid, fluorine, hydrochloric acid, chlorine, $BF_3$, $BCl_3$, KF, NaF, or mixtures thereof, depending on the activator. The volume of gases will also depend on the amount of activator used in the boronizing composition, where higher levels of activator correspond to higher levels of reaction gases. The boronizing gases can exit the retort via a nozzle on the retort and be directed to a reaction chamber. By mixing with and displacing the atmosphere inside the retort, the oxygen content of the atmosphere inside the retort is reduced to below the point at which oxidation and scaling occurs on the outside surfaces of the metal containers as well as helping to prevent oxidation and sintering of the boronizing powder in the powder packs, making it easier to remove metal articles from the powder packs after boronizing. The oxygen level of such an oxygen depleted atmosphere is generally less than 5.0 vol. % based on the total atmosphere. Preferably, the oxygen level is less than 3.0 vol %, and more preferably less than 1.0 vol %. Most preferably, the oxygen level is less than 0.5 vol %. Supplemental inert gas or an initial purge of inert gas may be supplied to the retort to supplement the boronizing gas flow to provide pressure drop necessary to traverse downstream equipment and to provide an initial assist in lowering oxygen levels inside the retort.

In one embodiment, metal pipes filled with boronizing powder are positioned inside a retort that is placed inside a furnace. As the boronizing reactions proceed, the reaction gases exit at least one end of the metal pipe and are directed to and mix with and displace the atmosphere inside the retort, such that the reaction gases fill the retort volume and contact the outside surface of the pipe as part of the mixed atmosphere of the retort. Boronizing reaction gases resulting from the boronizing process can include hydrofluoric acid, fluorine, hydrochloric acid, chlorine, $BF_3$, $BCl_3$, KF, NaF, or mixtures thereof, depending on the activator. The volume of gases will depend on the amount of activator used in the boronizing composition, where higher levels of activator correspond to higher levels of reaction gases. The boronizing gases can exit the retort via a nozzle on the retort and be directed to a reaction chamber. By mixing with and displacing the atmosphere inside the retort and thereby contacting the outside surface of the metal pipe, the oxygen content of the atmosphere inside the retort is reduced to below the point at which oxidation and scaling occurs on the outside surface of the metal pipe. Supplemental inert gas may be supplied to the retort to supplement the boronizing gas flow to provide pressure drop necessary to traverse downstream equipment and to provide an initial assist in lowering oxygen levels inside the retort.

In another embodiment, the pipe to be boronized is placed directly in the furnace. The metal pipe can be equipped with end fittings that cap the pipe and direct the reaction gases. The gases can be routed to the interior of the furnace and/or to a reaction chamber. As in the case of a retort, the boronizing gases can reduce the oxygen levels in the atmosphere of the furnace below those necessary to cause scaling and oxidation without using an inert gas purge. The reaction gases from the furnace can be routed to existing venting or directed to a reaction chamber.

Reaction Chamber

The reaction chamber is a vessel that treats the reaction gases produced in the boronization process. A concern with boronizing oilfield tubing is the large quantities of spent boronizing gases that can be generated due to the large quantities of boronizing powder required to fill these large components. Spent boronizing reaction gases contain toxic and harmful halide gases as halide activators, such as $KBF_4$, decompose upon heating into potassium fluoride (KF) and boron trifluoride ($BF_3$) gases. Furthermore, the $BF_3$ gas can hydrolyze according to the reactions below when it comes in contact with any moisture or water vapor present inside most furnace atmospheres, or will be present as these gases exhaust from the furnace to the environment.

Initial reaction sequence:

$$BF_3+(X)H_2O \rightarrow BF_3.(H_2O)_x \qquad \text{I.}$$

$$BF_3.2H_2O \rightarrow H_3O^+ + BF_3OH^- \qquad \text{II.}$$

$$4BF_3+3H_2O3 \rightarrow HBF_4+H_3BO_3 \qquad \text{III.}$$

Continued reaction sequence:

$$HBF_4 + H_2O \leftrightarrow HBF_3OH + HF \qquad \text{IV.}$$

$$HBF_3OH + H_2O \leftrightarrow HBF_2(OH)_2 + HF \qquad \text{V.}$$

These reactions will then allow for hydrofluoric acid (HF), fluoroboric acid ($HBF_4$), and boric acid ($H_3BO_3$), $BF_3 \cdot (H_2O)_x$ hydrates, and Trifluoro(hydroxy)borate(1-) |$HBF_3O$ to be present in the spent boronizing reaction gases, many of which are highly acidic, toxic and harmful. It is necessary to point out that all of the possible species present: —$BF_3$ hydrate(s), ionized $BF_3$ hydrate(s), hydroxy fluoroborate, and fluoroboric acid, are strong acids and must be treated as such when considering the environmental consequences of a $BF_3$ emission. They all contain combined fluoride, which will eventually affect human tissue if contacted in any significant quantity. Hydrofluoric acid has been detected in untreated spent boronizing reaction gas streams (Example 1) and it would be advantageous to neutralize these toxic species prior to release into the furnace atmosphere and environment, where they could have harmful reactions.

Treatment with calcium based alkalis (hydrated lime or calcium carbonate) favors hydrolysis of the Boron Trifluoride and precipitation of $CaF_2$ and $Ca(BO_2)_2 \cdot 6H_2O$, both of which may be recovered and disposed of as solids. In this example, the $BF_3$ gas stream will be passed through a reaction chamber similar to FIG. 7a and FIG. 7b, where calcium hydroxide is used to hydrolyze the $BF_3$ gas prior to it being exposed to any water vapor thus avoiding any of the reactions listed above from occurring and also neutralizing the $BF_3$ before release.

Additional reactions may also occur in the boronizing powders such as:

$$KBF_4 \rightarrow KF + BF_3 \qquad (1)$$

$$4BF_3 + 3SiC + 3/2O_2 \rightarrow 3SiF_4 + 3CO + 4B \qquad (2)$$

$$3SiF_4 + B_4C + 3/2O_2 \rightarrow 4BF_3 + SiO_2 + CO + 2Si \qquad (3)$$

$$B_4C + 3SiC + 3O_2 \rightarrow 4B + 2Si + SiO_2 + 4CO \qquad (4)$$

One other issue observed when boronizing is that silica glass ($SiO_2$) is often observed to form on metal and brickwork surfaces inside a furnace where vented spent boronizing reaction gases have combined with oxygen or water present in the furnace atmosphere. This can cause malfunction of furnace components such as load handlers, chains, rollers, and electric heating elements that are not intended to be coated with glass and silica glass can also harden and degrade the furnace insulation. Boronizing furnaces have been found to have large deposits of glass present in them after frequent use. Use of a reaction chamber with absorbent material can be used to eliminate any glass from forming inside boronizing furnaces or on the boronizing containers.

It is well known that releases of $BF_3$ to the atmosphere create a dense, white cloud. This dense white cloud is comprised of aerosol sized droplets of $BF_3$ hydrates formed by the very rapid reaction of $BF_3$ with water vapor in moist air, or even air with very low humidity. It is estimated the rate of reaction between $BF_3$ and water is in the order of microseconds. Although $BF_3$ is heavier than air, the thermal effect of the exothermic reaction between $BF_3$ and water vapor (24.51 kcal/g-mol) causes the cloud to initially become buoyant.

Figure 7A:
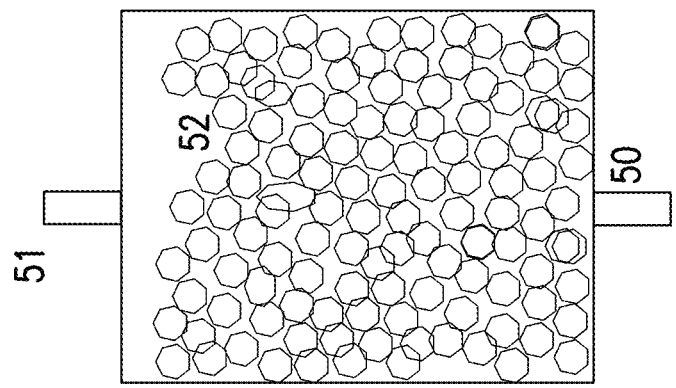
FIG. 7a illustrates a reactor chamber containing a series of plates containing absorbent material.
Figure 7B:
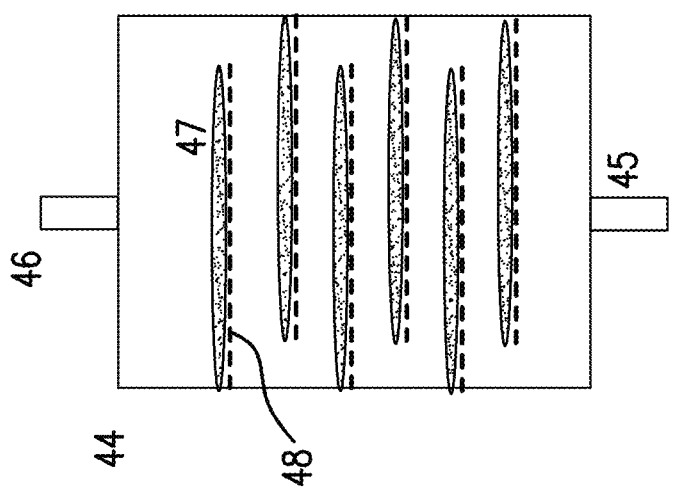
FIG. 7b illustrates an alternate configuration where the reactor chamber contains a bed of absorbent material.

The reaction chamber can be in the form of a fixed bed absorber, fixed multi-tube absorber or multi-plate absorber. When the chamber is a fixed bed absorber, as shown in FIG. 7b, absorbent material is present in a vessel through which the reactor gas flows, where the vessel provides the required residence time to treat the reaction gases. A multi-tube absorber is similar to the fixed bed absorber except that the chamber is filled with a plurality of tubes containing the absorbent material. Both the fixed bed and fixed multi-tube absorber may contain a gas distribution plate. The multi-plate absorber, shown schematically in FIG. 7a, is a configuration where flow is directed through and past absorbent material to promote contact. The absorbent material is selected from solid $Ca(OH)_2$, CaO, $CaCO_3$, soda glass, blast furnace slag, portland cement, sodium hydroxide, soda lime, sodium bicarbonate, limestone, alumina, or mixtures thereof.

In another embodiment, the disclosure of the present subject matter relates to a process comprising placing boronizing powder and a metal workpiece in a first container; boronizing the metal workpiece in a furnace, thereby forming spent boronizing gases; and flowing the spent boronizing gases through absorbent material or material prior to release into the furnace or the environment. The adsorption media or material is selected from solid $Ca(OH)_2$, CaO, $CaCO_3$, soda glass, blast furnace slag, portland cement, sodium hydroxide, soda lime, sodium bicarbonate, limestone, alumina, or mixtures thereof.

In one embodiment, the first boriding container comprises a seal, and is positioned inside a second neutralizing reaction container, where the second container is larger than the first container and wherein the seal of the first chamber, where reaction gases wll leak out of it, is submerged in the bed of absorbent material located inside the larger second chamber, so that any spent boronizing gases leaking out of the first container contacts passes through the absorbent material prior to exiting the second container. The first container may also be entirely submerged in the absorbent material so that the spent boronizing reaction gases pass through the absorbent material prior to exiting the second container.

Further, the second container may be sealed, where the boronizing reaction gases fill the second chamber and then flow to a separate reaction chamber filled with absorbent material positioned either inside or outside of the furnace, and spent boronizing reaction gases flow through the reaction chamber prior to release.

In another embodiment, the first container comprises an open top pot or a pan comprising a mesh screen basket with an overlaying bed of absorbent material positioned on top of the first container where spent boronizing reaction gases pass through the bottom of the mesh screen basket to exit the boronizing container passing through or contacting the absorbent material, before exiting the first container.

In still another embodiment the first container comprises a first chamber for housing the metal workpiece and boronizing powder, and a second chamber for housing the absorbent material, where the spent boronizing reaction gases pass from the first chamber to the second chamber where the gases must pass through the absorbent material prior to exiting the first container.

In another embodiment the first container comprises a lower boronizing compartment, an upper reaction chamber and a barrier, where the lower boronizing compartment is an open top box pot or pan for housing boronizing powder and workpieces. The barrier can be porous or solid, and can be selected from a heat resistant plate, foil, blanket, or combinations thereof, and can be positioned between the lower boronizing compartment and the upper reaction chamber. When the barrier layer is between the boronizing powder and the absorbent material, it unexpectedly prevents the absorbent material from deactivating the boronizing powder at the powder/absorbent interface and for several inches into the boriding powder pack. The upper reaction chamber positioned above the porous barrier layer, houses absorbent material such that the spent boronizing reaction gases flow from the lower boronizing compartment, through the barrier layer and into the upper reaction chamber.

In another embodiment, the first container is the workpiece and comprises open end(s), where only the interior surfaces of the workpiece is contacted with boronizing powder, and where spent boronizing reaction gases flow to a reaction chamber containing absorbent material before exiting the reaction chamber. The open end(s) of the workpiece or extensions attached to the open ends of the workpiece are filled with a layer of absorbent material such that spent boronizing reaction gases exiting the workpiece must contact and pass through the layer of absorbent material prior to exiting the workpiece.

Figure 2:
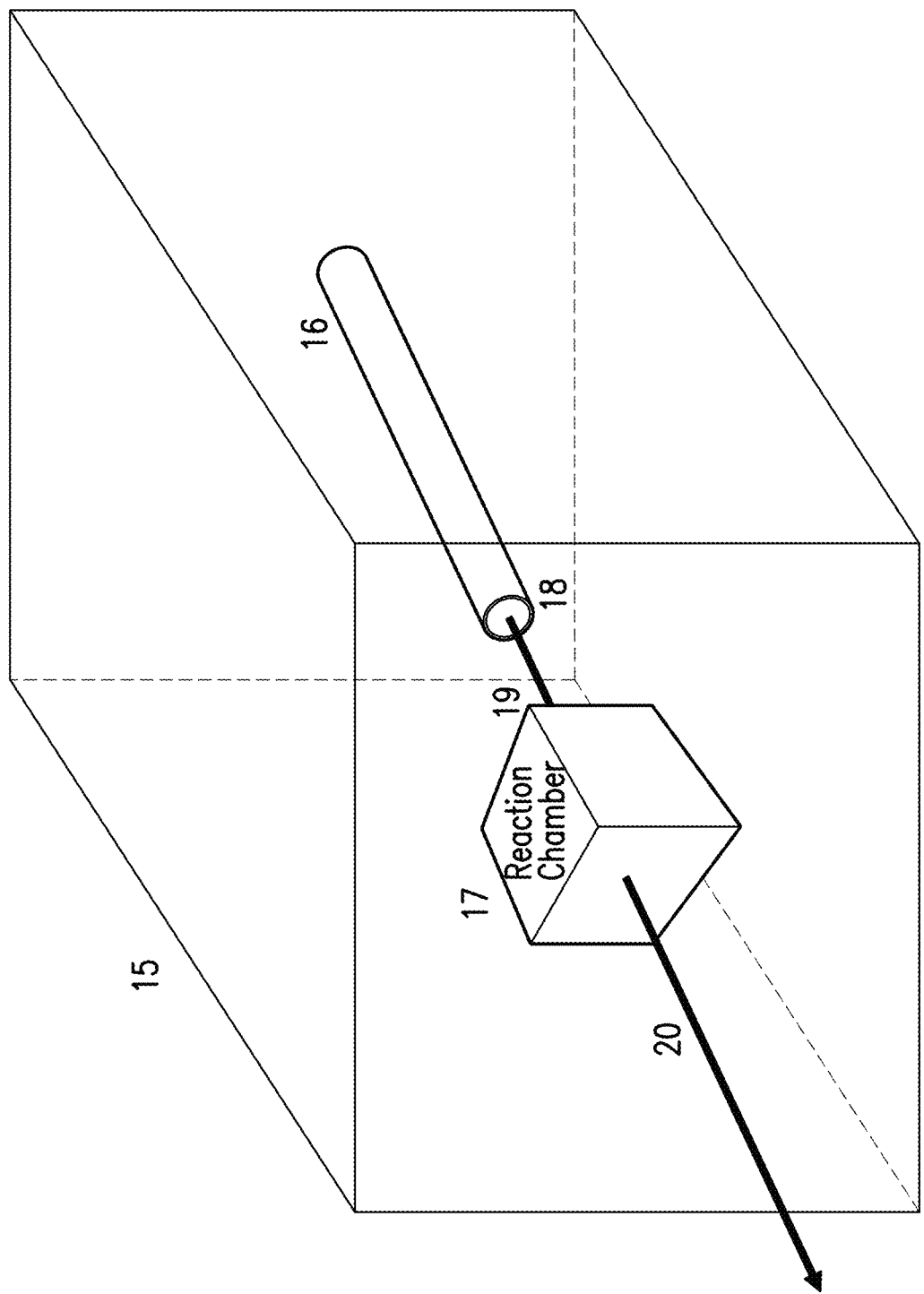
FIG. 2 illustrates a process where the boronizing reaction gases generated during boronizing in a furnace are directed to a reaction chamber for treatment, where the reaction chamber is located within the furnace.
Figure 3:
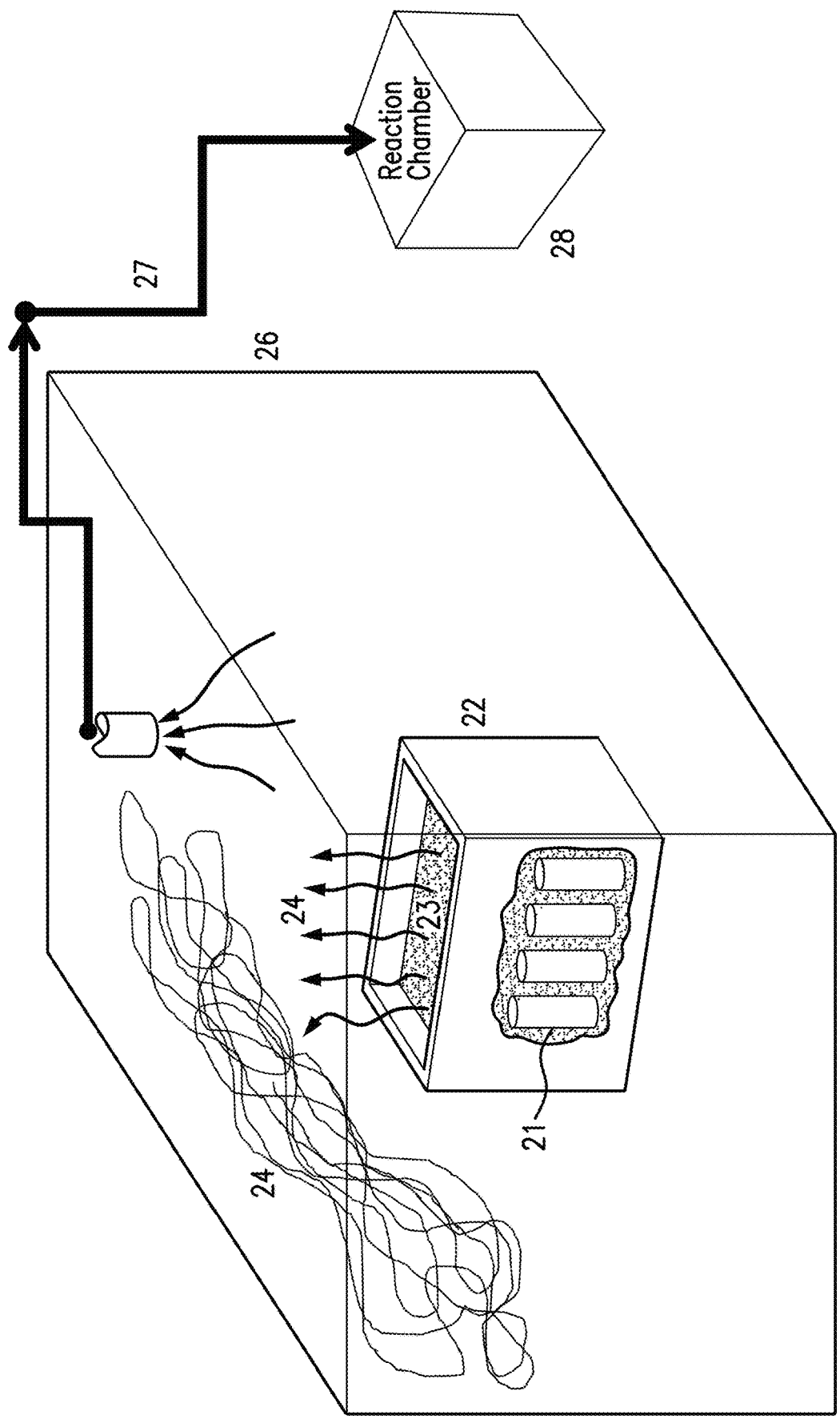
FIG. 3 illustrates reaction gases evolved from a boronizing powder pack that is routed to a reaction chamber outside a furnace.

The reaction chamber can be located inside or outside the furnace, as shown in FIG. 2 and FIG. 3. When the reaction chamber is located outside the furnace, it can also be a scrubber, where the reaction gases are contacted with aqueous solutions of the absorbent material described above. Preferably, the reaction chamber is located inside the furnace to prevent glass-like material and liquids from condensing and solidifying either in the piping leading to the reaction chamber or in the reaction chamber itself, which can plug the piping and block flow. It is possible to have a plurality of reaction chambers located both in and outside the furnace. For example, a first reaction chamber containing solid absorbent material can be present inside the furnace, with the gas outlet of the first reaction chamber routed to a second reactor chamber that can be a scrubber or solids-containing absorber located outside the furnace for a second phase of treatment.

Figure 5:
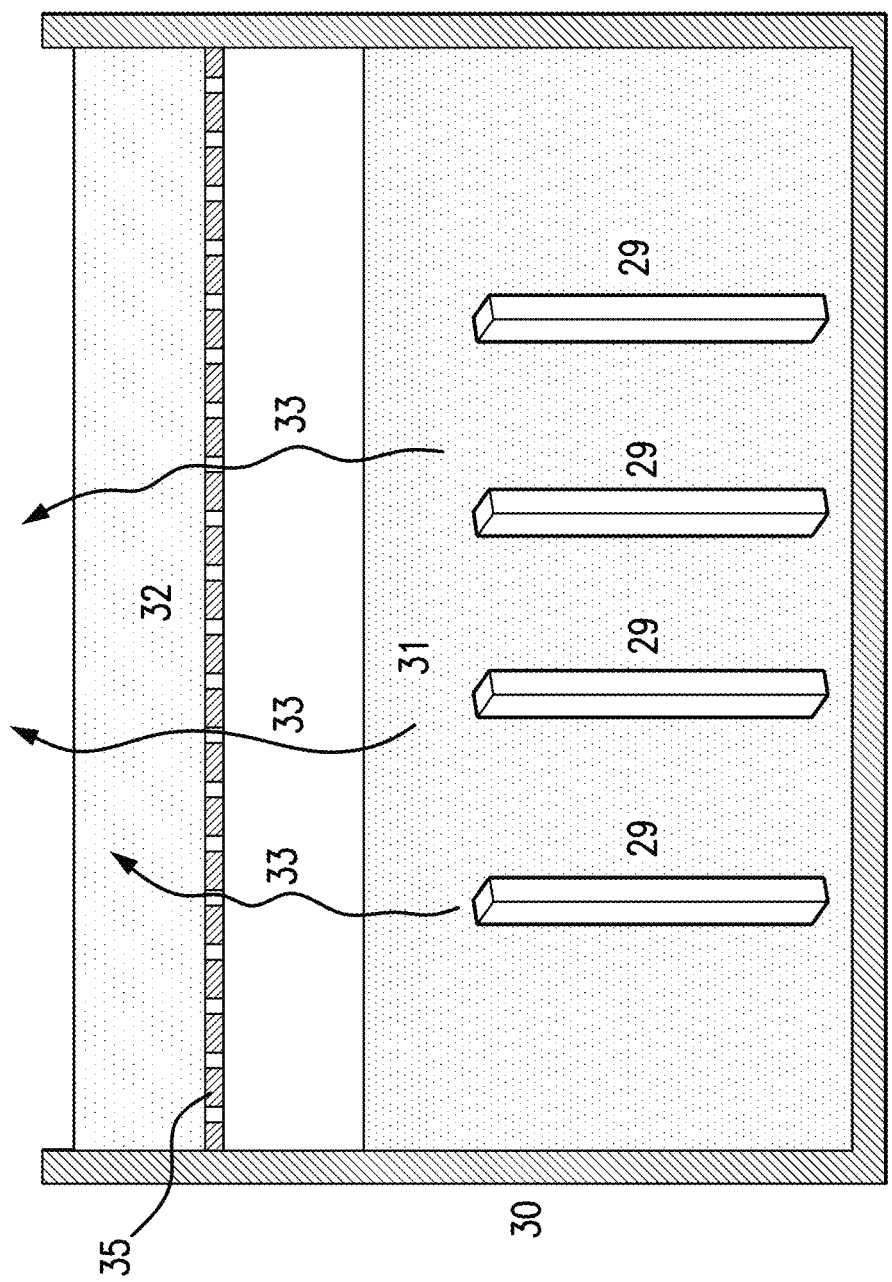
FIG. 5 illustrates a boronizing container filled with boronizing powder, metal articles to be treated that are submerged in the powder, and an elevated screen with absorbent material that any spent boronizing reaction gases must pass through in order to exit the container.

The reaction chamber may also be integrated into the containers holding the boronizing powders and workpieces. An example would be using an open-top pot or pan where boronizing powders and metal articles to be treated are positioned in the bottom portion of the container. Above the layer of boronizing powder, a layer of absorbent material is positioned to reside on top of the boronizing pack. The absorbent material is selected from solid $Ca(OH)_2$, CaO, $CaCO_3$, soda glass, blast furnace slag, portland cement, sodium hydroxide, soda lime, sodium bicarbonate, limestone, alumina, or mixtures thereof, as described above. An example of this type of reaction container configuration is shown in FIG. 5. The advantage of this type of reaction chamber is that no spent boronizing reaction gases can be released into the furnace or work environment without them first passing through or contacting the layer of absorbent material blocking the exit of the container. The container may be divided into multiple chambers for boronizing powder and an absorbent material bed by placing divider plates or foils between them in order to prevent mixing of the two materials. The use of a divider plate is preferred as it allows for greater boronizing reactivity with more halide gases being present in the boronizing powder pack near the interface between the two layers.

Another integrated reaction chamber can be arranged by placing a semi-sealed boronizing container with powder and metal articles to be treated into a larger vessel where the larger vessel is completely filled with absorbent materials and the boronizing container is completely submerged in absorbent material. Another integrated reaction chamber is arranged by placing multiple boronizing containers inside a sand-sealed retort and using absorbent materials as the sand-seal media where no spent boronizing reaction gases can exit the retort without contacting the absorbent material located in the sand sealing channel. After treatment in the reaction chamber(s), the reaction gases can also be treated in other conventional gas treatment operations such as a carbon bed or passed through a water spray.

If additional pressure drop is required to draw reaction gases through the reaction chamber and associated piping, it is possible to incorporate conventional equipment such as a vacuum pump, ejector or compressor that takes suction on the downstream/upstream piping containing the reaction gases.

Boron Source

The boron source for use in the powder boronizing composition can generally be any reactive boron solid capable of reacting with an activator to form gaseous boron trihalides, such as $BF_3$ or $BCl_3$. These gaseous compounds react with the surface of the metal to deposit boron on the surface of the workpiece which may then diffuse into the metallic structure and form an iron-boride compound layer. Preferably, the boron source is selected from $B_4C$, amorphous boron, calcium hexaboride, borax or mixtures thereof. More preferably, the boron source is $B_4C$.

Activator

The activator for use in the powder boronizing composition can generally be any halide-containing compound that is capable of reacting with the boron source after heating as described above to form gaseous boron trihalides, such as $BF_3$ or $BCl_3$. The boron molecules are then inserted by a gas diffusion process into the metal structure. Preferably, the activator is selected from $KBF_4$, ammonia chloride, cryolite, sodium fluoride, ammonium bifluoride, potassium fluoride, calcium fluoride, or mixtures thereof. More preferably, the activator is $KBF_4$.

Sintering Reduction Agent

When a sintering reduction agent is present in the powder boronizing composition, the sintering reduction agent facilitates facilitates the operation and ease of performing the boronizing process by preventing sintering of the powder composition. This is an important consideration in process optimization, particularly in those situations where long, small diameter tubes must be boronized, because sintered materials cling to themselves and to the surfaces of the metal part. It can be a time-consuming process to remove the sintered material, especially in the case when the interior of long pipes are being boronized. Even in the case of simple geometry parts being boronized, it can be very challenging to remove parts from a sintered block of boronizing powder after the process is complete which forms if the boronizing powder does not contain a sintering reduction agent. Very small parts can also be lost in the sintered boronizing powder which is not readily ground or crushed back down to loose powder that can be sifted and sieved to retrieve small parts. Without wishing to be bound by theory, it is believed that the sintering reduction agent functions by scavenging oxygen from the atmosphere of the boronizing process. Preferably, the sintering reduction agent is selected from carbon black, graphite, activated carbon, charcoal, or mixtures thereof. More preferably, the sintering reduction agent is carbon black Diluent The diluent is included in the boronizing powder composition to provide bulk to the composition. The diluent must have good heat conductivity, must not sinter together during the process, and have high density making it more difficult for outside atmosphere gases to permeate into the pack and also making it more difficult for the boriding vapors (BF$_3$, BCl$_3$) to quickly exit the pack, and preferably, should be inert to the activator, boron source and sintering reduction agent. Preferably, the diluent is selected from SiC, alumina, zirconia or mixtures thereof. More preferably, the diluent is SiC.

Boronizing Compositions

In one embodiment, the boronizing powder composition comprises: 0.5 to 25.0 wt % of a boron source; 1.0 to 25.0 wt % of an activator; and 50.0 to 98.5 wt % of a diluent, based on the total weight of the boron source, activator and diluent. Preferably, the boronizing powder composition comprises 2.0 to 20.0 wt % of the boron source; 2.0 to 20.0 wt % of the activator; and 60.0 to 96.0 wt % of the diluent, based on the total weight of the boron source, activator and diluent, where the boron source, activator and diluent are as defined above. More preferably, the boronizing powder composition comprises 3.0 to 6.0 wt % of the boron source; 2.0 to 8.0 wt % of the activator; and 75.0 wt % to 86.0 wt % of the diluent, based on the total weight of the boron source, activator and diluent.

In another embodiment, the boronizing powder composition comprises 0.5 to 25.0 wt % of a boron source; 1.0 to 25.0 wt % of an activator; and 50.0 to 98.5 wt % of a sintering reduction agent, based on the total weight of the boron source, activator and sintering reduction agent, where the boron source, activator and sintering reduction agent are as defined above. Preferably, the boronizing powder composition comprises 2.0 to 20.0 wt % of the boron source; 2.0 to 20.0 wt % of the activator; and 60.0 to 96.0 wt % of the diluent, based on the total weight of the boron source, activator and sintering reduction agent. More preferably, the boronizing powder composition comprises 3.0 to 6.0 wt % of the boron source; 2.0 to 8.0 wt % of the activator; and 75.0 wt % to 86.0 wt % of the sintering reduction agent, based on the total weight of the boron source, activator and sintering reduction agent.

In still another embodiment, the subject matter of the present disclosure relates to a boronizing powder composition comprising: 0.5 to 3.0 wt % of a boron source selected from B$_4$C, amorphous boron, calcium hexaboride, borax or mixtures thereof; 1.0 to 15.0 wt % of an activator selected from KBF$_4$, ammonia chloride, cryolite, sodium fluoride, ammonium bifluoride, potassium fluoride, calcium fluoride, or mixtures thereof; and 82.0 to 98.5 wt % of a stream selected from sintering reduction agents, diluents or mixtures thereof, the sintering reduction agents being selected from carbon black, graphite, activated carbon, charcoal or mixtures thereof, and the diluents being selected from SiC, alumina, zirconia or mixtures thereof.

In still another embodiment, a particularly effective powder boronizing composition of the present subject matter has been particularly designed to provide a boride layer of exceptionally high Fe$_2$B level with little or no FeB, high hardness, low porosity with good thickness levels, as well as an excellent uniformity of the boride layer. Preferably, the powder boronizing composition contains: (a) 0.5 to 4.5 wt % of a boron source; (b) 45.5 to 88.5 wt % of a diluent; (c) 1.0 to 20.0 wt % of an activator; and (d) 10.0 to 30.0 wt % of a sintering reduction agent, based on the total weight of the boron source, diluent, activator and sintering reduction agent, and where the boron source, diluent, activator and sintering reduction agent are as described above. More preferably, the powder boronizing powder composition contains (a) 2.0 to 4.0 wt % of the boron source; (b) 61.0 to 83.5 wt % of the diluent; (c) 2.5 to 10.0 wt % of the activator; and (d) 12.0 to 25.0 wt % of the sintering reduction agent. Even more preferably, the powder boronizing compositions contains: (a) 2.0 to 3.0 wt % of the boron source; (b) 69.0 to 76.0 wt % of the diluent; (c) 4.0 to 6.0 wt % of the activator; and (d) 18.0 to 22.0 wt % of the sintering reduction agent.

Preferably, the powder boronizing composition has a ratio of component (d)/component (a) of 2.2 to 60.0. More preferably the powder boronizing composition has a ratio of component (d)/component (a) of 3.0 to 12.5. Even more preferably, the powder boronizing composition has a ratio of component (d)/component (a) of 6.0 to 11.0.

Levels of the boron source less than those recited can result in a poorer quality boride layer due to thinner boride layers and larger gaps and spacing between the teeth in the boride layer that would be occupied by lower hardness substrate material. The boride layer may also be inferior, because the surface structure is composed of both ferrite plus single phase Fe$_2$B. Levels of the boron source greater than those recited can result in poorer boride layer quality due to formation of a dual-phase boride layer comprised of both FeB and Fe$_2$B which has inferior performance characteristics when compared to a single-phase boride layer comprised of only Fe$_2$B iron boride. Levels of activator less than those recited can result in sintering of the boronizing powder, a highly porous boride layer, or a poorer quality boride layer due to incomplete layers or the formation of voids and porosity in the boride layer. Levels of activator greater than those recited can also result in sintering of the boronizing powder, as well as excessive unnecessary quantities of spent reaction gas, as described below, which can present environmental challenges. Levels of sintering reduction agent less than those recited can result in the boriding powder pack becoming sintered into a solid block of caked powder that is extremely difficult to break apart and remove parts from after processing. Levels of sintering reduction agent greater than those recited can result in shallower boride layers and the boriding powder having greatly reduced thermal conductivity, making it take longer to heat and cool the boriding powder packs. With lower thermal conductivity, it is more difficult to uniformly boride parts in larger size powder packs as the center portion of large packs are much slower to heat and cool than the outside edges of the same pack. The density of the sintering reduction agent is also lower than the bulk powder, and it has been observed that the iron-boride compound layers are not as compact and dense below the surface when excessive amounts of sintering reduction agent are used instead of filling with more dense diluent materials such as SiC powder. This is mainly due to a specific mass of the sintering reduction agent occupying more volume than the same mass of SiC powder, thus making the same weight percentages of boron source and activator become more dilutely spread out across a larger volume of powder. Levels of diluent less than those recited can result in the inclusion of active components at higher levels than are desirable from an economic standpoint. Levels of diluent less than those recited could also lead to dual-phase iron-boride compound layers if the boriding pack becomes too potent with not enough diluent present. Levels of diluent greater than those recited can result in levels of active components that are too low to provide adequate boride layer properties.

Properties of Boronized Metals

The properties of the boride layer affected by the powder boronizing process include thickness, thickness variability, relative concentrations of Fe$_2$B and FeB, hardness and porosity. The thickness of the layer can vary depending on the boronizing powder composition, the metal being boronized, the length of time for the boronizing and the temperature of the boronizing. The thickness of the boride layer is typically from 0.0005 to 0.020 inches. Preferably, the boride layer is 0.002 to 0.015 inches. More preferably, the boride layer is 0.005 to 0.015 inches. The thickness of the boride layer is calculated as the maximum distance from surface of the workpiece to the deepest tips of the boride layer observed in the cross-sectioned microstructure, where the boride layer depth is measured by examining a cross-section of a treated surface using an optical microscope.

The variability of the thickness of the boride layer is a measure of the consistency of the boronizing process. Optimally, the variability should be as low as possible, since the degree of protection the boronized article enjoys from the boriding is dependent on its thickness, and portions of the boronized article having a lower thickness are obviously less protected.

For the purpose of this specification, the variability of the thickness of the layer is defined as the range of boride layer depth results observed in at least 5 randomly selected locations of the surfaces being examined, i.e., the distance in inches between the highest value and the lowest value. For example, if the analysis of five locations results in a layer thickness ranging from 0.008" to 0.014", the variability is the difference between the highest and lowest values, 0.006". The reported thickness of the layer is the midpoint of that range, or 0.011". Preferably, the variability of the thickness of the layer produced by the process of the present subject matter is no greater than 0.005". More preferably, the variability of the thickness of the layer is no greater than 0.003". However, in no event will the variability be greater than 50.0% of the boride layer thickness.

The formation of the boride layer can include two phases: $Fe_2B$ and FeB. Of these two phases, $Fe_2B$ is preferred because it is less brittle than a FeB phase and exists under a state of compressive residual stress instead of tensile residual stress. Moreover, because the two phases have different coefficients of thermal expansion, mixtures of the two phases are subject to crack formation at the $Fe_2B$/FeB interface of a dual-phase layer. The cracks can result in spalling or flaking, or even failure when subjected to mechanical stress. Thus, the percentage of $Fe_2B$ in the borided layer should be as high as possible. Preferably, the boride layer comprises 90.0 to 100.0 vol % $Fe_2B$ and 0 to 10.0 vol % FeB, where the fractions of $Fe_2B$ and FeB are measured by comparing the depth of the $Fe_2B$ boride layer teeth to the depth of the FeB boride layer teeth in the cross-sections examined; (e.g., if the total boride depth is 0.010", with the $Fe_2B$ depth being 0.008" and the FeB depth being 0.002", then the boride layer would be said to contain 20 vol % of the FeB and 80 vol % of the $Fe_2B$, based on the total amount of the FeB and $Fe_2B$). More preferably, the boride layer comprises 95.0 to 100.0 vol % $Fe_2B$ and 0 to 5.0 vol % FeB. Even more preferably, the boride layer comprises 98.0 to 100.0 vol % $Fe_2B$ and 0 to 2.0 vol % FeB. Most preferably, the boride layer should be a single phase $Fe_2B$ layer, where for the purpose of this specification, the term "single-phase $Fe_2B$ layer" means the layer contains no FeB.

Porosity is also a measure of the quality of the boride layer, where porosity is voids or discontinuities in the layer. Preferably, the porosity of the boride layer should be less than 10%, where the porosity is measured by visual estimate or image analysis of the boride layer microstructure. More preferably, the porosity of the boride layer should be less than 5%.

Hardness of the boride layer is measured according to the Vickers Hardness test, ASTM E384 where hardness measurements may be made directly on the treated surface or may be made on a mounted and polished cross-section of the boride layer. Preferably, the hardness of the borided layer is from 1100 to 2900 HV. More preferably, the hardness of the borided layer in ferrous materials is from 1100 to 2000 HV.

The boronized pipes produced according to the present subject matter are especially useful in processes of the oil and gas industry where the pipes are employed in deep wells. Preferably, the boronized pipes are used in a process where a sucker and rod pump is employed within the pipe.

Referring now to FIG. 1, shown is a view of a metal pipe 2 inside a vessel 1, where the pipe 2 and vessel 1 are being heated in a furnace (not shown). Boronizing powder (not shown inside pipe 2) reacts to boronize the inner surface of the pipe 2. Reaction gases 4 flow from the capped pipe ends 10 and 11 to fill the interior of vessel 1, eventually exiting through vent nozzle 5. Pipe ends 10 and 11 can be slip caps tack welded to the pipe or threaded end caps to prevent loss of powder, but not having a completely sealed fit, to allow vapor to escape. Alternately, the pipe ends can be a ceramic fiber or metallic foil. Optionally, additional inert gas may be supplied through inlet nozzle 6 to purge reaction gases from the vessel after the boronizing is complete, or purge air out of the retort before heating to prevent oxidation and scaling. Such a purging on cool down can be conducted after cooling of the pipe, so that air can be used. Nitrogen, argon or other inert gases could also be used prior to cooling in order to accelerate the cooling step. The pipe outside surface 3 thus contacts the boronizing reaction gases that have mixed with the atmosphere inside vessel 1, thereby reducing oxygen levels and preventing oxidation and scaling of the outside surface 3 of the pipe. In this figure, vessel 1 is shown as a box container having front face 7a, back face 7b, bottom face 8a, top face 8b, side face 9a and side face 9b. However, the vessel could be any suitable shape for housing pipe 2 for boronizing such as a cylindrical retort. Similarly, the gases are shown exiting pipe ends 10 and 11 directly, but one skilled in the art would understand that one or both ends of the pipe could be equipped with piping that directs the reaction gases 4 into the interior of vessel 1 in a particular way. The piping can also split flow of the reaction gases 4, where a portion of the flow is directed to the interior of vessel 1 and the remainder being routed to a reaction chamber (not shown) where the reaction gases 4 are treated. The reaction chamber (not shown) can be located either in or out of the furnace.

Referring now to FIG. 2, shown is a diagram where furnace 15 contains pipe 16 and reaction chamber 17. Pipe 16 is equipped with a cap 18 containing an outlet line 19 leading to the reaction chamber 17. Boronizing reaction gases produced in the pipe 16 flow through reaction chamber 17 and the treated gases exit the reaction chamber 17 through line 20.

Referring now to FIG. 3, shown is four workpieces 21 placed inside a rectangular boriding container 22, that has been nearly filled with boronizing powder 23. Upon heating, boronizing reaction gases 24 are evolved and exit the boronizing powder pack. These boronizing reaction gases 24 will fill a sealed retort or sealed furnace volume 26. The boriding gases will be transferred through piping 27 to a reactor chamber 28 that may be located inside or outside of the furnace.

Figure 4:
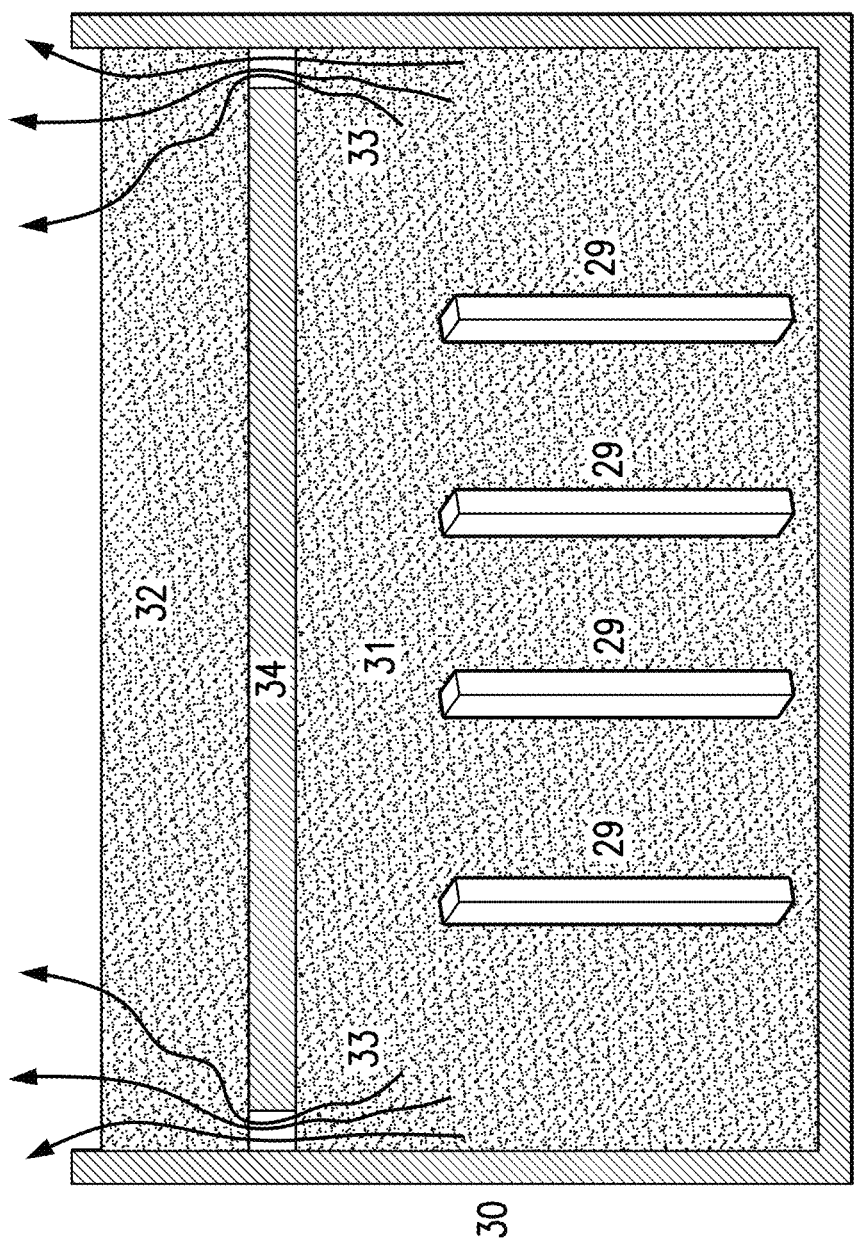
FIG. 4 illustrates a boronizing container filled with boronizing powder, metal articles to be treated that are submerged in the powder, and a covering layer of absorbent material that any spent boronizing reaction gases must contact prior to exiting the container.

Referring now to FIG. 4, shown are four workpieces 29 placed inside a rectangular boriding container 30, that has been nearly filled with boronizing powder 31. Above the boriding powder lays a bed of absorbent material 32. Upon heating, the boronizing powder 31 starts to evolve boriding reaction gases 33 which permeate through the boriding powder pack and eventually exit out the top surface of the boronizing powder pack 31. These spent boronizing reaction gases 33 will then pass through a layer of absorbent material 32 that resides above the boronizing powder pack. The boronizing reaction gases are not able to exit the boronizing container 30 without contacting or passing through the bed of absorbent material 32. As spent boronizing reaction gases 33 contact or pass through the absorbent material 32, the boron trihalide gases will react with the absorbent material to capture the halide elements and remove them from the spent boronizing reaction gases 33, to reduce final emissions of halide elements in the gases exiting the boronizing container 30. An optional block or sheet of heat resistant and chemical resistant material 34 can be placed between the boronizing powder pack 31 and the absorbent material layer 32 in order to reduce emissions of gases out the top of the boronizing powder pack along with keeping the two chemicals physically separated from each other to prevent any direct reactions.

Referring now to FIG. 5, shown is four workpieces 29 placed inside a rectangular boriding container 30, that has been nearly filled with boronizing powder 31. Above the boriding container, lays a screen mesh basket 35 filled with absorbing material 32. Upon heating, the boronizing powder 31 starts to evolve boriding reaction gases 33 which permeate through the boriding powder pack and eventually exit out the top surface of the boronizing powder pack 31. These spent boronizing reaction gases 33 will then pass through the mesh basket 35 bottom into a layer of absorbent material 32 that resides above the boronizing powder container and is sealed against the edges to prevent leakage of fumes from occurring at the interface between boronizing container and mesh basket. The boronizing reaction gases are not able to exit the boronizing container 30 without passing through the bed of absorbent material 32. As spent boronizing reaction gases 33 pass through the absorbent material 32, the boron trihalide gases will react with the absorbent material to capture the halide elements and remove them from the spent boronizing reaction gases 33 to reduce final emissions of halide elements in the gases exiting the boronizing container 30.

Figure 6:
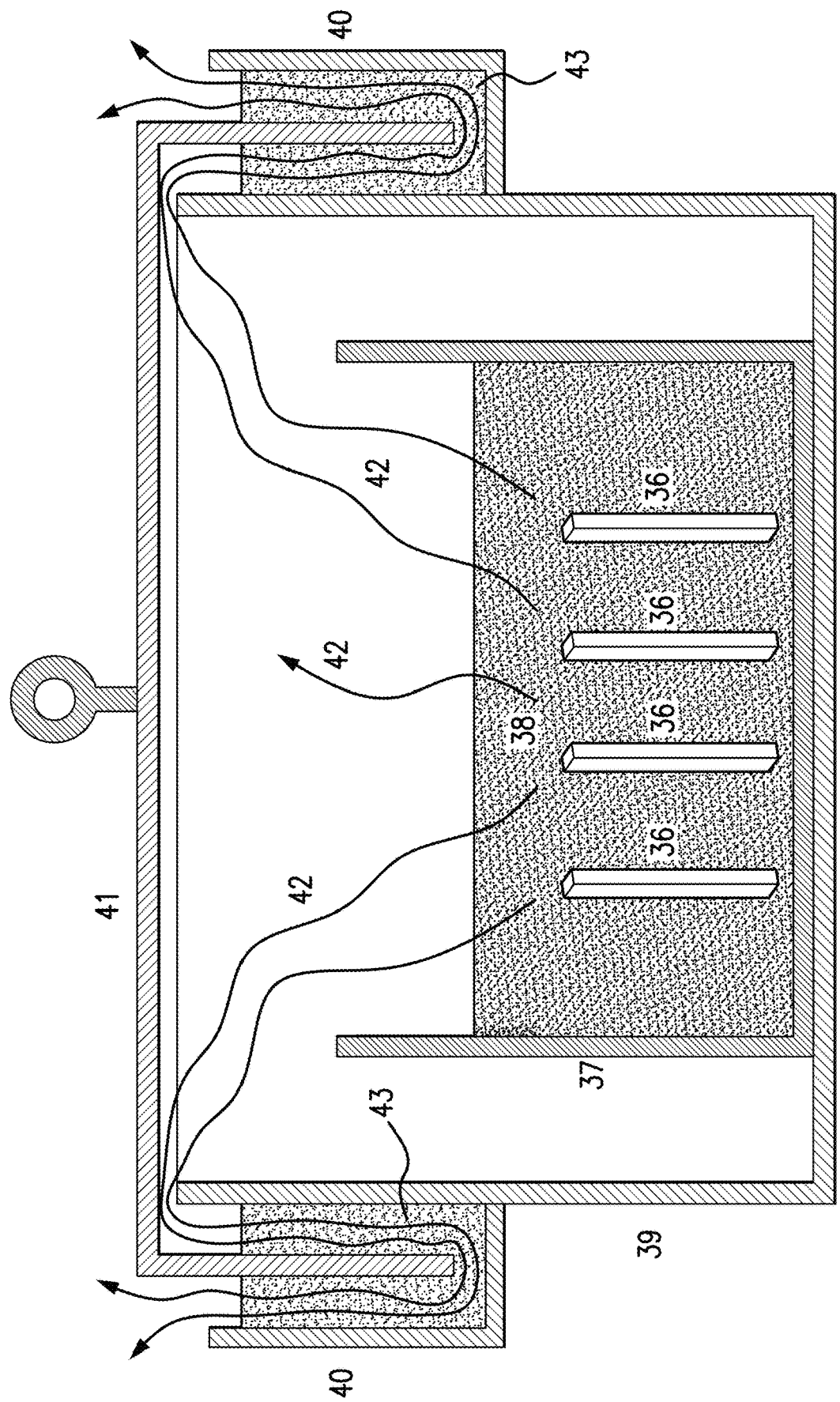
FIG. 6 illustrates four workpieces boronized inside a boronizing container placed in a larger retort vessel designed to be sealed at a sand seal channel by a knife-edged lid. The sand seal channel is filled with absorbent material that spent boronizing reaction gases must pass through in order to exit the container.

Referring now to FIG. 6, shown are four workpieces 36 to be boronized that are placed inside a boronizing container 37 which is then filled with boronizing powder 38. One or multiple boronizing containers may be placed in a larger retort vessel 39 designed to be sealed at a sand seal channel 40 by placing a knife-edged lid 41 into the sand seal channel 40. Upon heating, the boronizing powder 38 evolves boronizing reaction gases 42. As pressure builds within the retort vessel 39, spent boronizing gases 42 will pass through the sand seal media 43 which is a halide absorbent material 43 that reacts with boron trihalide gases and captures halide elements in order to reduce halide emissions into the furnace and work environment.

Referring now to FIGS. 7a and 7b, shown in FIG. 7a is reactor chamber 44 containing inlet 45, outlet 46, and a series of plates 48 containing absorbent material 47 configured to force reaction gases to flow past or through the absorbent material. Plates 48 can be solid or perforated to permit flow through the material. An alternate configuration is also shown in FIG. 7b, where reactor chamber 49 is containing inlet 50, outlet 51, and a bed of absorbent material 52 fills the reactor chamber which is configured to force reaction gases to flow past the absorbent material 52. Absorbent material can be present as a powder or in larger lump or pebble size such that gases can pass through the bed by moving between the open spaces between particles of absorbent material.

The following Examples further detail and explain the preparation and performance of the powder boronizing compositions. Those skilled in the art will recognize many variations that are within the spirit of the invention and scope of the claims.

EXAMPLES

Example 1

Figure 8:
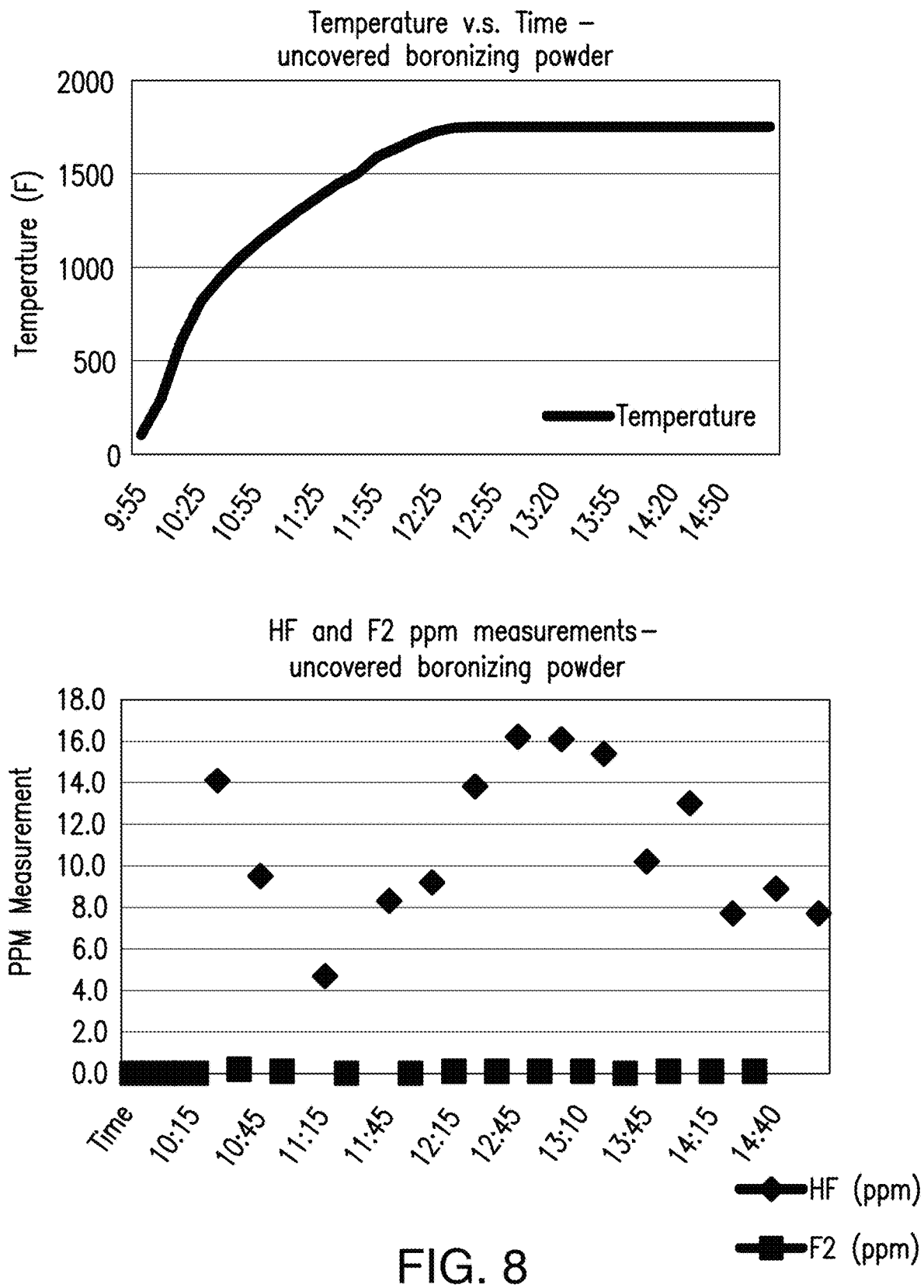
FIG. 8 illustrates temperature versus time data for the boronizing operation, and HF and $F_2$ production versus time for Example 1.

A 6"×6"×4" high pot of boronizing powder comprised of 81.8 wt % SiC-4.5 wt %, $KBF_4$-4.5 wt % $B_4C$-9.2 wt % carbon black. The carbon black was heated in a small furnace with a single exhaust port exiting the furnace. A gas leak detector analyzer with a sensor to detect ppm levels of HF gas was placed directly at the exit port of the furnace to sample gases exiting the furnace. This first example was meant to establish the baseline amount of HF and $F_2$ fumes being emitted during the boronizing process. Measurements of ppm HF and $F_2$ were taken at intervals during the process and results are shown in FIG. 8. A peak value of 16.2 ppm HF and 0.2 ppm $F_2$ were measured and a large amount of white smoke was seen exiting the furnace.

Example 2

Figure 9:
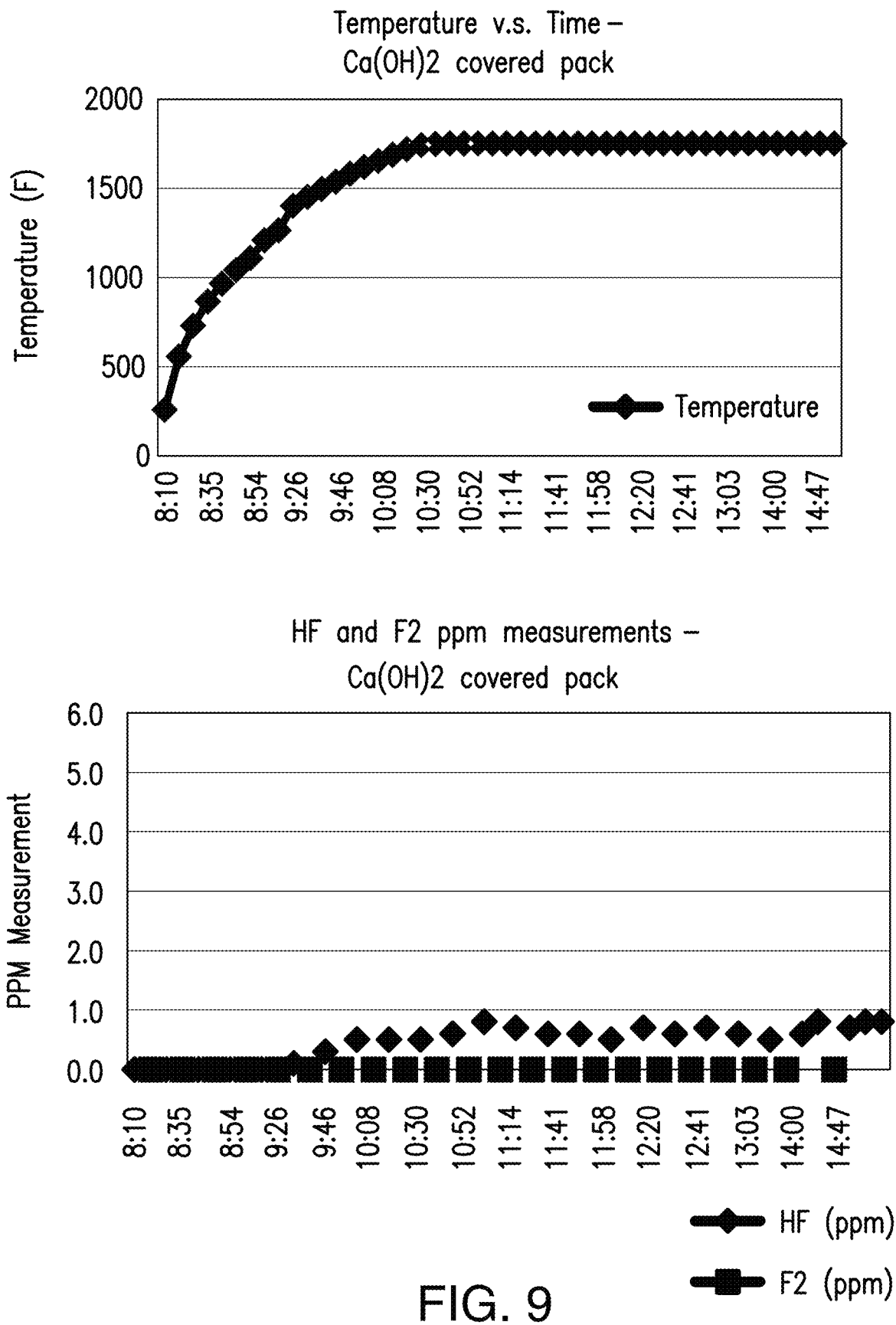
FIG. 9 illustrates temperature versus time data for the boronizing operation, and HF and $F_2$ production versus time for Example 2.

The same 6"×6"×4" high pot with the same boronizing powder composition from Example 1 was processed, however, in this example a wire mesh screen basket was placed over the open top of the boronizing container and the basket was filled with calcium hydroxide $Ca(OH)_2$ powder (Hydrated Lime). The same measurements for ppm HF and $F_2$ were taken and results are shown in FIG. 9. A peak value of 0.8 ppm HF and 0.0 ppm $F_2$ were measured and no white smoke was seen exiting the furnace.

Example 3

Figure 10:
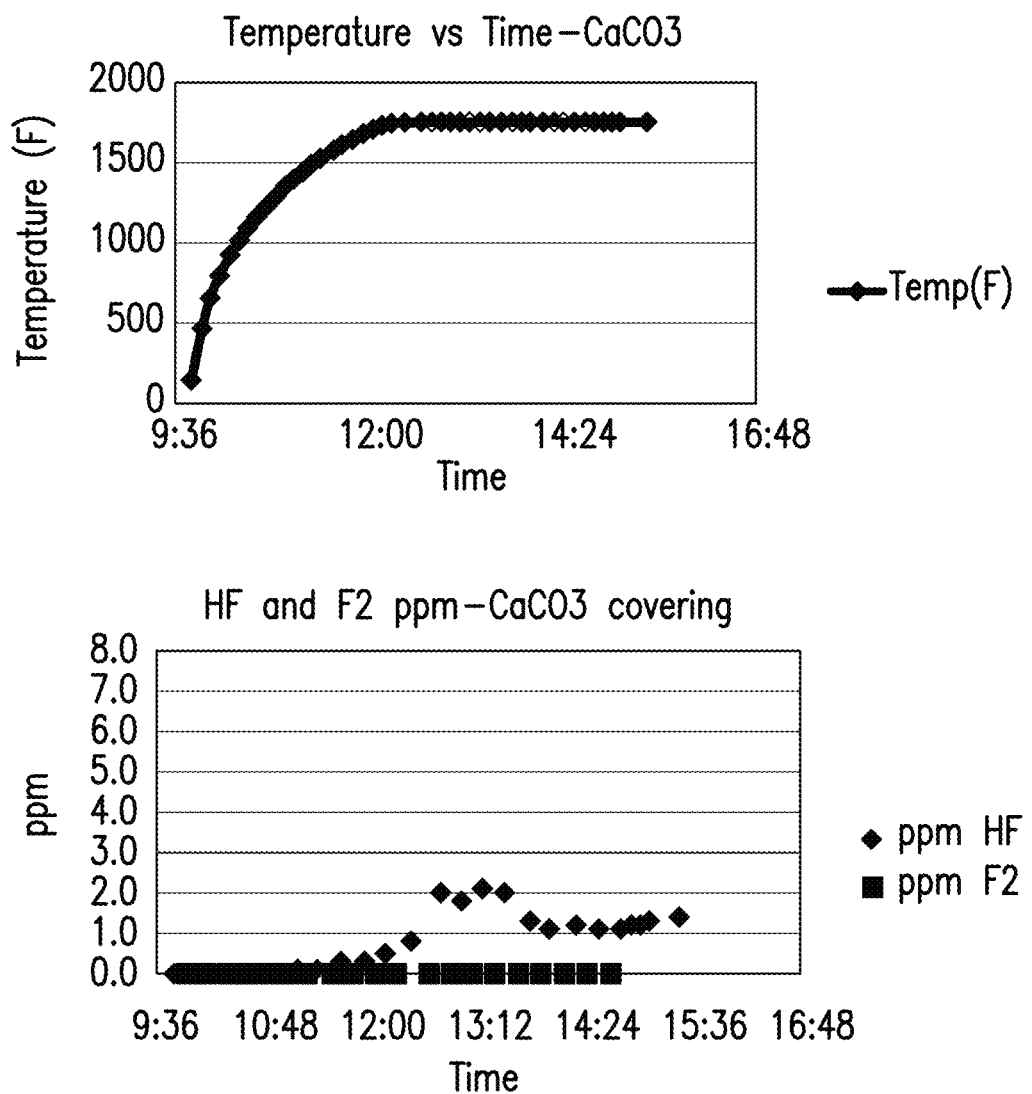
FIG. 10 illustrates temperature versus time data for the boronizing operation, and HF and $F_2$ production versus time for Example 3.

The same 6"×6"×4" high pot with the same boronizing powder composition from Example 1 was processed, however, in this example a wire mesh screen basket was placed over the open top of the boronizing container and this basket was filled with calcium carbonate $CaCO_3$ (limestone) powder. The same measurements for ppm HF and $F_2$ were taken and results are shown in FIG. 10. A peak value of 2.1 ppm HF and 0.0 ppm $F_2$ were measured and traces of white smoke were seen exiting the furnace.

Example 4

Figure 11:
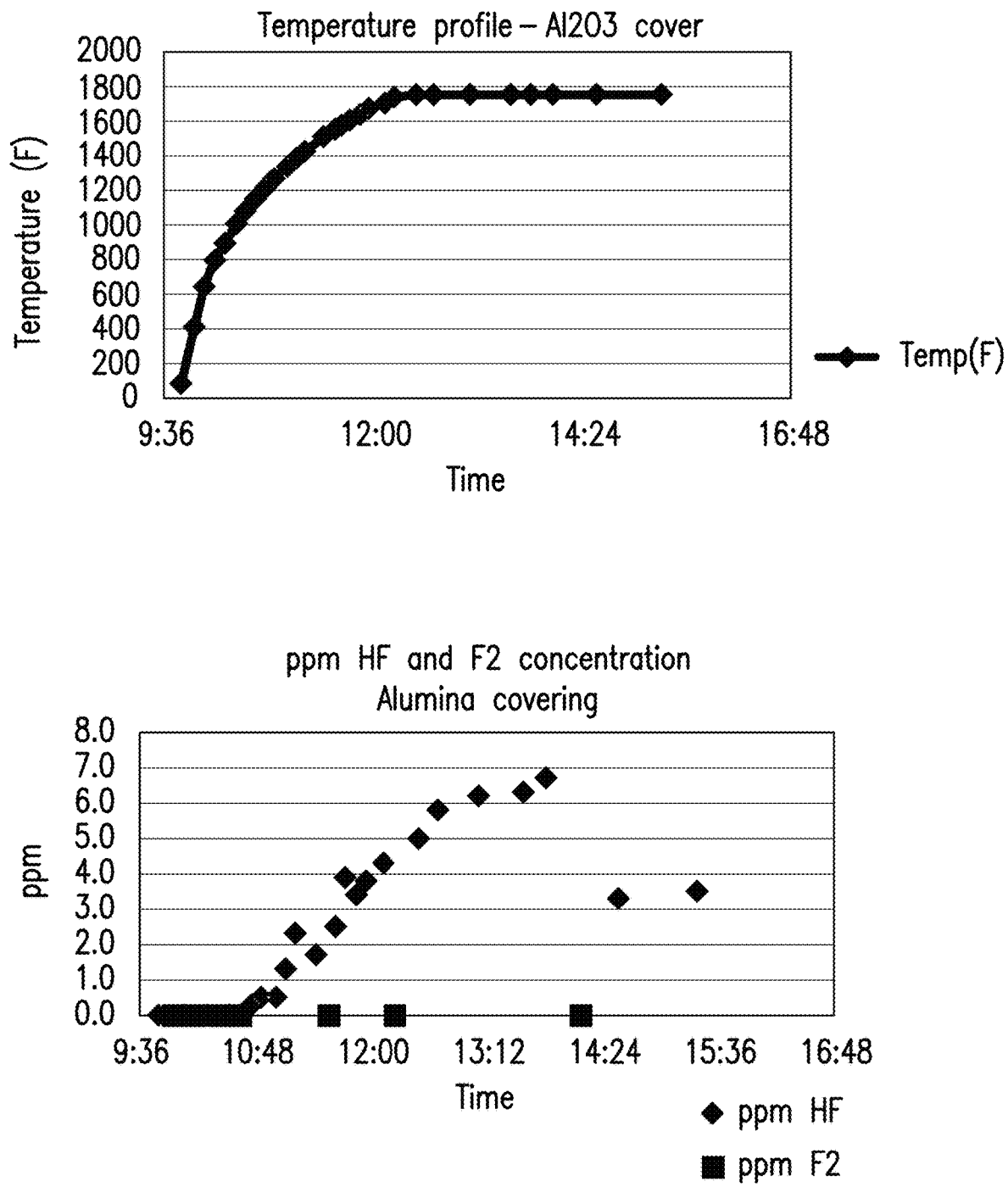
FIG. 11 illustrates temperature versus time data for the boronizing operation, and HF and $F_2$ production versus time for Example 4.

The same 6"×6"×4" high pot with the same boronizing powder composition from Example 1 was processed, however in this example a wire mesh screen basket was placed over the open top of the boronizing container and this basket was filled with alumina $Al_2O_3$ powder. The same measurements for ppm HF and $F_2$ were taken and results are shown in FIG. 11. A peak value of 6.7 ppm HF and 0.0 ppm $F_2$ were measured and large amounts of white smoke were seen exiting the furnace.

Example 5

Figure 12:
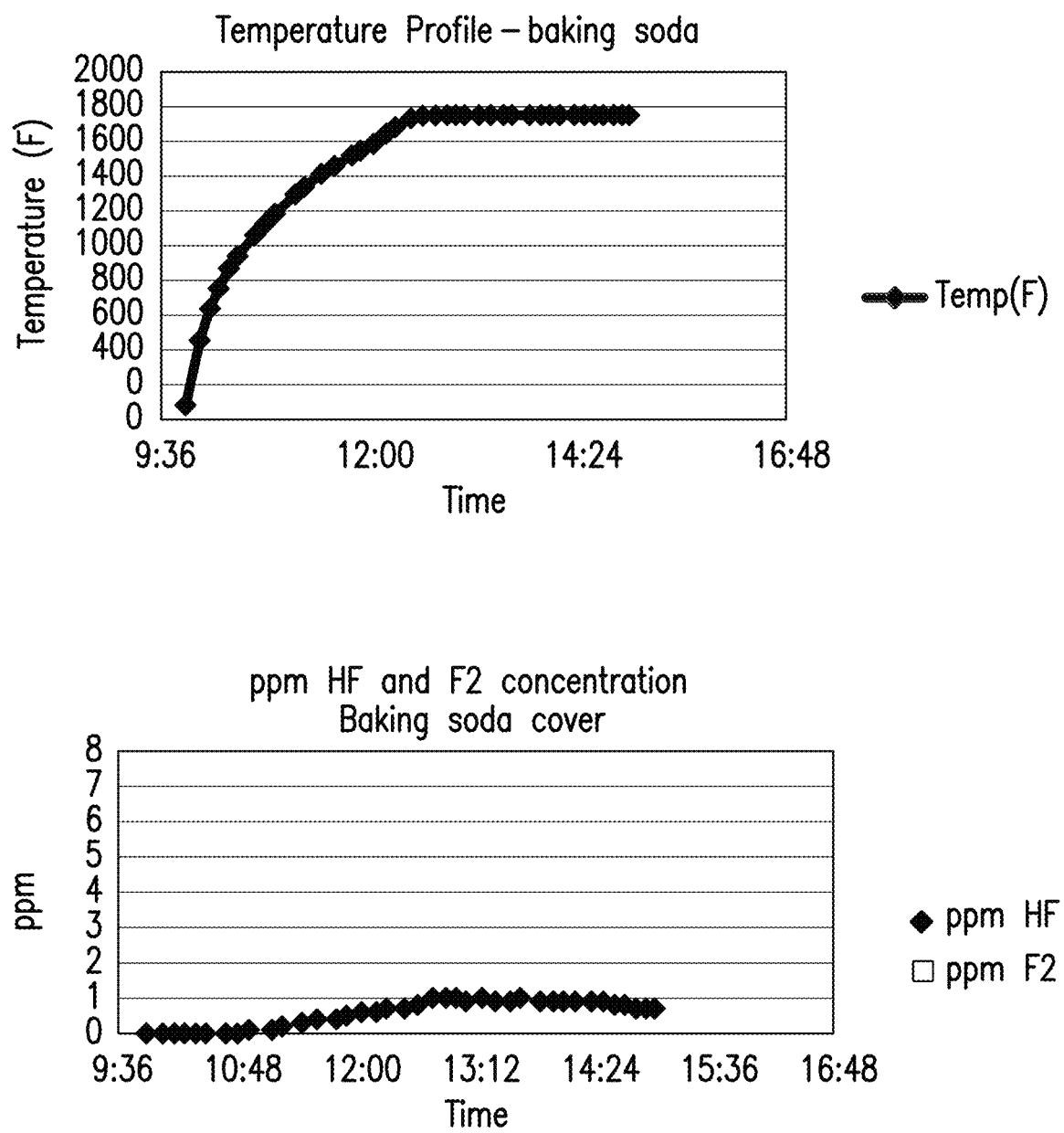
FIG. 12 illustrates temperature versus time data for the boronizing operation, and HF and $F_2$ production versus time for Example 5.

The same 6"×6"×4" high pot with the same boronizing powder composition from Example 1 was processed, however in this example a wire mesh screen basket was placed over the open top of the boronizing container and this basket was filled with sodium bicarbonate NaHCO$_3$ (baking soda) powder. The same measurements for ppm HF and F$_2$ were taken and results are shown in FIG. 12. A peak value of 1.0 ppm HF and 0.0 ppm F$_2$ were measured and no white smoke was seen exiting the furnace.

Example 6

Figure 13:
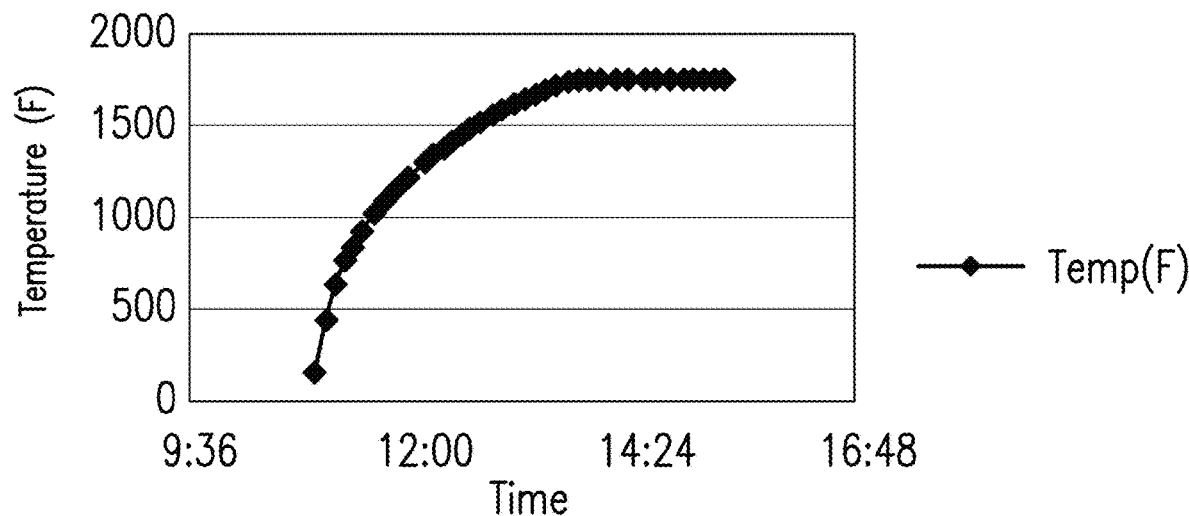
FIG. 13 illustrates temperature versus time data for the boronizing operation, and HF and $F_2$ production versus time for Example 6.
Figure 13:
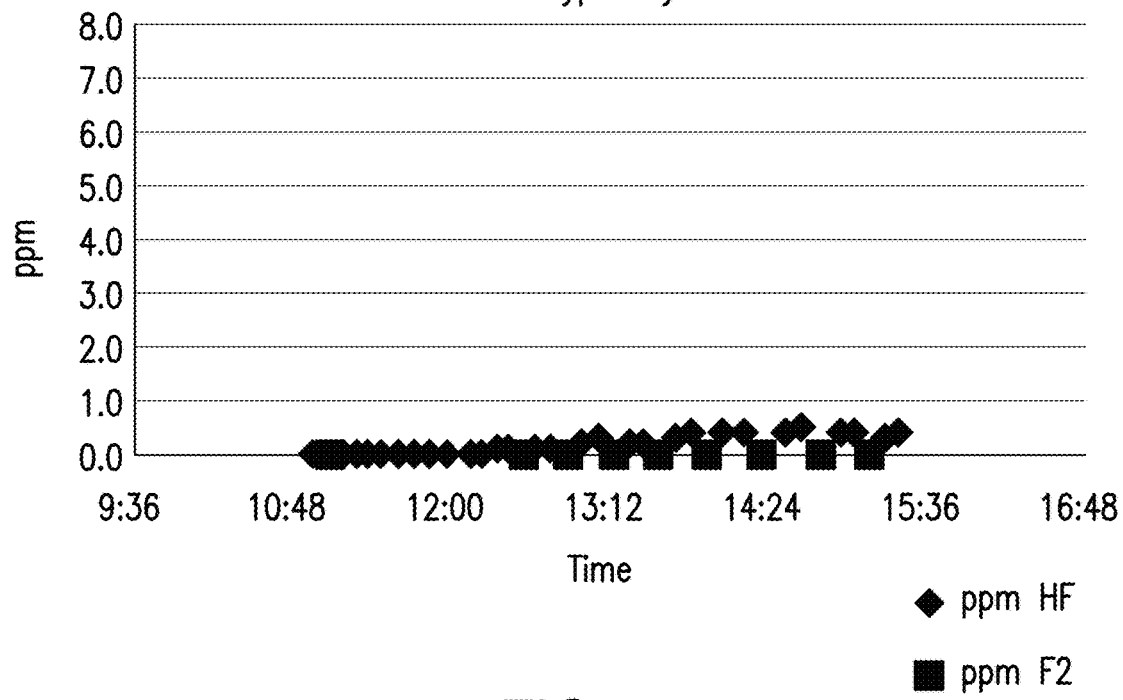

The same 6"×6"×4" high pot with the same boronizing powder composition from Example 1 was processed, however in this example a wire mesh screen basket was placed over the open top of the boronizing container and this basket was filled with a commercially sold Western Miracle Type "S" hydrated lime powder. The same measurements for ppm HF and F$_2$ were taken and results are shown in FIG. 13. A peak value of 0.5 ppm HF and 0.0 ppm F$_2$ were measured and no white smoke was seen exiting the furnace.

Example 7

Boronizing containers consisting of open-top pans with interior dimensions of 21"×12.75"×8" tall were filled with metal articles to be boronized followed by boronizing powder of composition 81.8 wt % SiC-4.5 wt % KBF$_4$-4.5 wt % B$_4$C-9.2 wt % carbon black which completely filled the interior dimensions of the pan. These boronizing containers were then covered at the top with a 12"×24"×1" deep mesh screen basket which was filled with calcium hydroxide powder (hydrated lime) to a depth of 1" thick similar to the schematic shown in FIG. 5. Ten of these covered boronizing containers were loaded into a continuous furnace already heated to 1750° F. and measurements of the flue gas for ppm HF were taken for the next 80 minutes at the furnace door and also at a rooftop furnace flue. A peak value of 0.1 ppm HF was measured at the furnace door and 2.0 ppm HF was measured at the rooftop flue exit. No white smoke was observed inside the furnace or at the flue exit during this portion of the experiment. After 80 minutes of measuring, an identical size tray of ten more uncovered pans was loaded into the same furnace with the same quantity of workpieces, pans, and boronizing powder. 18 minutes after loading the uncovered pans, white smoke was observed coming out of the furnace. A peak value of 2.5 ppm was measured at the furnace door and 54.2 ppm HF was measured at the rooftop flue exit. Large quantities of white smoke was observed at the rooftop flue and this flue was also coated in a white precipitate presumed to be boric acid which is formed by hydrolysis of BF$_3$ when exposed to water vapor in air. The reduction of white smoke with the covered trays relative to when the trays were uncovered demonstrates the effectiveness of the absorbent material.

Example 8

A boronizing container was designed as shown in FIG. 4 where the absorbent material could be loaded directly into the boronizing container instead of sitting on an elevated basket with mesh bottom above the boronizing container. The container had interior measurements of 11"×19"×8" tall. Workpieces and powder were loaded into the bottom 6 inches of this container and the top 2" of the container was filled with absorbent material. The boriding powder had composition of 81.8 wt % SiC-4.5 wt % KBF$_4$-4.5 wt % B$_4$C-9.2 wt % Carbon Black. The container was heated to 1750° F. and observed in the furnace to detect if white smoke fumes or HF was found emanating from the container. No signs of white smoke were observed and no HF gases were detected which is evidence of the effectiveness of the covering absorbent material in neutralizing and reducing BF$_3$ emissions.

Example 9

Two open top cylindrical boriding containers measuring 10" diameter by 10" deep were filled with a boriding powder composition of 71 wt % SiC-5 wt % KB$_4$F-4 wt % B$_4$C-20 wt % carbon black. These containers were loaded into a larger sealed retort. In addition to the containers, several test pieces of steel were placed inside the retort to determine if the boriding fumes could protect the workpieces surfaces from being oxidized during heating when no inert gases were flowing into the retort and it was initially filled with air. The retort was designed according to the drawing in FIG. 3 where it had an outlet port, and all the spent boronizing reaction gases were piped to an absorption bed reaction chamber located outside the furnace. The furnace was heated to 1650° F. for 3 hours and cooled. During an early portion of the run, the outlet port was not connected to the reaction chamber and copious amounts of white smoke with acrid scent flowed heavily out of the retort. Once smoke was observed, the outlet port was connected to the reaction chamber such that the spent boriding gases must pass through the reaction chamber designed with multiple layers of hydrated lime powder according to FIG. 3 and no smoke was observed exiting after the gases were forced to pass through the reaction chamber. 0 ppm HF was detected exiting the reaction chamber. After cooling, the retort was opened and it was observed that the steel test pieces were completely free from any oxidation as they were protected by the spent boriding fumes which would have purged all air from the retort during heating and lowered the oxygen content of the atmosphere inside the retort.

Example 10

Figure 14:
FIG. 14 illustrates photographs of the small tubes inside the larger sealed retort tube before and after boriding; and scaled tubes that were run in air outside the retort as in Example 10.
Figure 14:
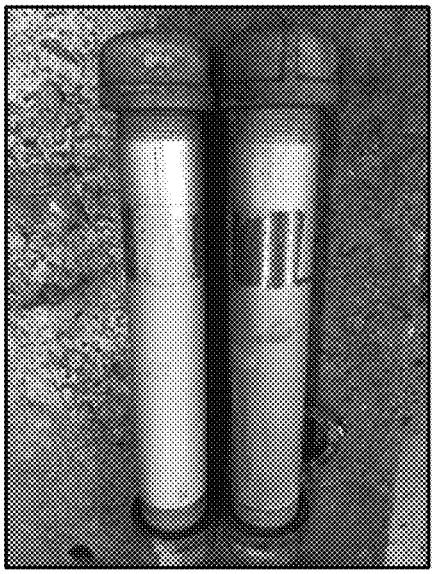
Figure 14:
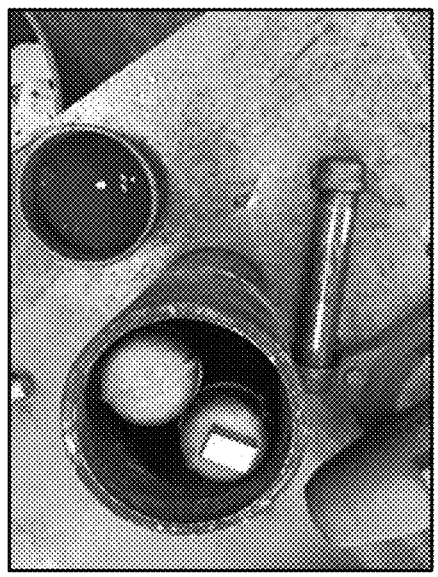
Figure 14:
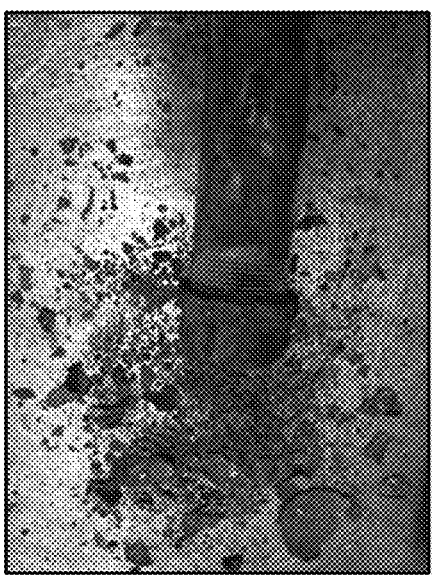

Interior surfaces of tubing and pipes are commonly borided to increase the wear resistance of the interior surfaces. Boronizing is often performed by filling the tubes or pipes with boronizing powder and capping the ends shut to hold powder inside. However, the outside surfaces of the pipe would be oxidized and scaled if heated in air atmosphere which would cause loss of wall thickness and effectively lower the burst pressure of the tubing. One method to prevent this problem is to perform heating in a furnace or in a sealed retort with inert gases filling the furnace or retort. However, nitrogen and argon gases can be expensive to use. This example illustrates using the spent boronizing fumes to create an inert low oxygen content atmosphere that can prevent the tubes from oxidizing and scaling during heating by loading tubes in a manner similar to FIG. 1. In this example, small tubes measuring 1.25" diameter×12" long were filled with boronizing powder and capped shut with threaded end pipe caps. Two of these tubes were then placed inside a larger tube measuring 4" ID×12.5" long. The larger tube was then sealed shut by slipping a machined end cap over the end of the tube with a 0.010" gap between the ID of the end cap and the OD of the larger tube and sealing distance of 1". A 1018 steel test coupon was also added into the larger retort placed loose around the two small tubes. This larger sealed tube with two smaller tubes inside was then placed inside a furnace and heated to 1750° F. for 16 hours. The larger tube was not initially purged with any inert gases as it was sealed shut with air inside. One additional 1.25"×12" long tube was filled with boronizing powder and processed loose in the furnace outside of the larger sealed tube for comparison. After processing, the loose tube was heavily scaled and oxidized from heating in air. The larger tube was removed from the furnace, the end cap was removed and we observed white smoke inside the sealed larger tube retort at opening. The exterior of the two tubes and 1018 test coupons were still bright, shiny and showed no signs of oxidation or scaling present. The inside surfaces of the tubes had a 0.010" to 0.014" deep boride layer present where it was in contact with the boronizing powder. Photographs of the small tubes inside the larger sealed retort tube before and after boriding are shown in FIG. 14.

Example 11

Upscaling from Example 10, 2.875" diameter×16' long oil field tubing was boronized on the inner diameter of the tubing. The boronizing cycle was 1750° F. for 16 hours in an air atmosphere direct-fired carbottom furnace. In this example, one oil field tube was filled with boronizing powder, capped at the ends to hold powder inside the bore of the tube, and this tube was then placed inside a larger retort tube. This larger retort tube was then semi-sealed shut using a slip-on cap that was tack welded in place. Upon heating, the fumes emanating from the boronized tubing leak out of the oilfield tube and these fumes will fill the empty volume in the larger retort tube displacing and purging the air that was initially present inside the larger sealed retort. The spent boronizing reaction gases purge air from the retort and create a low oxygen content atmosphere within the larger retort that protected the exterior surfaces of the boronized oilfield tube from being oxidized and scaled. In the same furnace load, five more oilfield tubes were each filled with boronizing powder and capped shut on the ends of these tubes to hold the powders inside. The five oilfield tubes where then placed inside a larger sealed muffle that has an open end for loading and unloading but can be sealed shut using a flange attached to the muffle and bolting a flat plate of steel with ceramic blanket gasketing between the end plate and muffle flange similar to FIG. 1. Upon heating, spent boronizing reaction gases emanate from inside the boronized oilfield tubing and leaks out of the caps fitted to the ends of the tubes. The spent boronizing reaction gases then fill the empty volume of the larger sealed muffle displacing air that was initially present and creating a low oxygen atmosphere that prevents oxidation and scaling of the five oilfield tubes. Two oil field tubes were also run in this furnace load without any larger vessel surrounding them inside an air atmosphere direct-fired furnace for comparison. Boronizing powders were placed inside these tubes and they were capped shut to hold powder inside. Upon heating, the fumes that leak from the caps of these tubes are insufficient in quantity to affect the larger air-filled furnace atmosphere and these two unprotected tubes were badly oxidized and scaled on the exterior surfaces during boronizing. FIG. 15 shows photographs of loading for all three methods along with final results for tube exterior appearance and scaling.

Example 12

In this example, seven pieces of oilfield tubing measuring 2.875"×16 feet long were all boronized together in a single furnace load. Each tube was filled with boronizing powder completely, and capped on the ends to hold powder in position and prevent spillage. Upon heating to 1750° F. for 16 hours, boronizing reaction gases form during decomposition of the $KBF_4$ activator present in the powder and these gases pressurize inside oilfield tubing and eventually spent boronizing reaction gases leak out of the caps into the furnace atmosphere. During this heat cycle, observations were made outside of the furnace and a large dense white cloud of gases was observed exiting the furnace through the flue similar to what is described as commonly occurring during hydrolysis of $BF_3$ gas when it reacts with water vapor. A white cloud was observed rising out of the rooftop furnace flue with no reaction chamber or absorbent material being employed. After processing the seven tubes, a second furnace heat containing 10 tubes was processed using the same endcaps and loading practices. In this second heat, a reaction chamber was added inside the furnace and piping was added from the boronizing retort vessel to allow for flow of gases from the boronizing retort to the reaction chamber, through three levels of horizontal plates loaded with hydrated lime powder, and then exiting out the bottom of the scrubber. Upon heating, no signs of white smoke clouds could be observed emanating from the furnace. HF was also undetectable when drawing a sample of gas from inside the furnace while this heat was being boronized. After the heat was complete, the reaction chamber was opened up and the top layer of hydrated lime closest to the boronizing retort appeared heavily reacted. The second layer down was less reacted and the third layer near the bottom of the reaction chamber was only lightly reacted. The reaction chamber and absorbent material appeared to be successful in neutralizing $BF_3$ gas inside the reaction chamber before it was released into the furnace atmosphere.

Example 13

A small boronizing furnace was used for boriding for several months where no reaction chamber was utilized nor was any absorbent material employed to prevent $BF_3$ emissions into the furnace atmosphere. After several months of operation and fewer than 200 cycles, thick glass deposits were observed to be forming on the brickwork inside the furnace along with glass forming on the electric heating elements. The brickwork has peeled and material loss from the brickwork has been observed where the glass deposits had been forming. Electrical shorting of the heating elements and breakage of several heating elements had also occurred. A second new furnace was installed for boronizing loads without using boronizing containers designed in accordance with FIG. 3, 4, 5, or 6, where the boriding containers were designed to have hydrated lime present at the opening that spent boronizing reaction gases must pass through before release into the furnace, or where boronizing is carried out in a sealed retort with hydrated lime present in a sand-seal channel and/or where the spent boronizing gases are vented through piping outside of the furnace to an external reaction chamber. By using these methods and boronizing containers designed to neutralize $BF_3$ gases before release, this furnace has processed over 250 loads of boronizing work with no traces of glass formation anywhere in the furnace.

Examples 14-22

A series of boriding powder compositions were prepared to evaluate sintering performance and evaluation of the boriding layer deposited. The compositions included a boron source ($B_4C$), activator ($KBF_4$), sintering reduction agent (carbon black), and diluent (silicon carbide). The level of boron source was varied, while maintaining the activator and carbon black levels constant. Pieces of precision ground AISI 1018 steel (⅛" thick×½" long) were cut from a single bar all having the same steel chemistry. Each bar was notched on the end of bar to identify it. Each of the boriding powder compositions was then placed inside a small sealed pipe constructed from a standard black iron threaded pipe nipple (¾" pipe size×4" long) with two ¾" cast iron threaded pipe caps screwed onto both ends. The steel test bars were suspended in the center of the sealed pipes completely submerged in the boriding powder composition. All the sealed capped pipes holding the test bars suspended in powder inside the capped pipes were placed inside a large container and loaded into a furnace. The furnace was ramped up to heat at 500° F. per hour to 1750° F. and held at 1750° F. for 12 hours at heat followed by slow cooling. The atmosphere in the furnace was air. At the end of the boriding, each pipe was opened and its contents removed. The powder was examined for evidence of sintering, and each test bar was sectioned, mounted, ground and polished. The cross-sections were then etched with a 2% nital acid solution to reveal the boride layer microstructure present in the cross-section. The boride layer microstructures were photographed and the boride layer analyzed. The boriding compositions and results are shown in Table 1.

layer" means layers with empty pores (voids) present in the boride layer that have poor mechanical properties. It's just literally bubbles of gas or vacuum beneath the surface that form when we don't have enough $KBF_4$ present. The term "single-phase $Fe_2B$ solid layer," means a complete layer having a single phase of $Fe_2B$ with no FeB or ferrite present.

The results of Table 1 indicate that none of the Examples exhibited sintering. Samples 14-16, corresponding to boron source concentrations 0.3 to 1.0 wt % exhibit incomplete boride layers at the surface. Samples 17-21, corresponding to boron source concentrations of 2.0 to 4.5 wt % exhibit a solid, single-phase layer of $Fe_2B$. Sample 22, corresponding to a boron source concentration of 5.0 wt %, produces a boride layer having a mostly single-phase $Fe_2B$ solid layer, with some FeB at the surface.

TABLE 1

| Example | 14 | 15 | 16 | 17 | 18 | 19 | 20 | 21 | 22 |
| --- | --- | --- | --- | --- | --- | --- | --- | --- | --- |
| $B_4C$, wt % | 0.3 | 0.5 | 1.0 | 2.0 | 2.5 | 3.0 | 4.0 | 4.5 | 5.0 |
| $KBF_4$, wt % | 5.0 | 5.0 | 5.0 | 5.0 | 5.0 | 5.0 | 5.0 | 5.0 | 5.0 |
| Carbon Black, wt % | 20.0 | 20.0 | 20.0 | 20.0 | 20.0 | 20.0 | 20.0 | 20.0 | 20.0 |
| Silicon Carbide, wt % | 74.7 | 74.5 | 74.0 | 73.0 | 72.5 | 72.0 | 71.0 | 70.5 | 70.0 |
| Sintering | no | no | no | no | no | no | no | no | no |
| Boride Layer Thickness, inch | 0.004 | 0.004 | 0.005 | 0.0075 | 0.008 | 0.008 | 0.010 | 0.009 | 0.010 |
| Boride Layer Quality* | (1) | (1) | (1) | (2) | (2) | (2) | (2) | (2) | (3) |

*(1) incomplete layer at surface
(2) single-phase $Fe_2B$ solid layer
(3) mostly single-phase $Fe_2B$ solid layer, some FeB at surface
(4) highly porous and incomplete layer For the purposes of this specification, the term "incomplete layer at surface" means the presence of iron-boride compound, but not a continuous layer. This surface structure is ferrite which is a steel structure where there is not any iron-boride layer precipitating out right at the surface of the part. The term "shallow or shallower" boride layer means that the layer is not as deep, and refers to how deep below the surface of the borided part where an iron-boride compound is present. The term "highly porous and incomplete Examples 23-30

A series of boriding powder compositions were prepared and tested as with Examples 14-22 above. The boriding compositions and results are shown in Table 2, where the activator $KBF_4$ is varied between 0.5 to 25.0 wt %, while the boron source and carbon black concentrations are held constant.

TABLE 2

| Example | 23 | 24 | 25 | 26 | 27 | 28 | 29 | 30 |
| --- | --- | --- | --- | --- | --- | --- | --- | --- |
| $B_4C$, wt % | 2.5 | 2.5 | 2.5 | 2.5 | 2.5 | 2.5 | 2.5 | 2.5 |
| $KBF_4$, wt % | 0.5 | 1.0 | 3.5 | 4.0 | 6.0 | 10.0 | 20.0 | 25.0 |
| Carbon Black, wt % | 20.0 | 20.0 | 20.0 | 20.0 | 20.0 | 20.0 | 20.0 | 20.0 |
| Silicon Carbide, wt % | 77.0 | 76.5 | 74.0 | 73.5 | 71.5 | 67.5 | 57.5 | 52.5 |
| Sintering | yes | yes | no | no | no | no | no | yes |
| Boride Layer Thickness, inch | 0.004 | 0.006 | 0.008 | 0.008 | 0.010 | 0.010 | 0.010 | 0.010 |
| Boride Layer Quality* | (4) | (4) | (2) | (2) | (2) | (2) | (2) | (2) |

*(1) incomplete layer at surface
(2) single-phase $Fe_2B$ solid layer
(3) mostly single-phase $Fe_2B$ solid layer, some FeB at surface
(4) highly porous and incomplete layer The results of Table 2 indicate that samples having the lowest levels of activator (Examples 23 and 24 with activator levels of 0.5 and 1.0 wt %, respectively), and at the highest level of activator (Example 30, activator level of 25.0 wt %) exhibit sintering. Examples 23 and 24 also exhibit highly porous and incomplete boride layers, with the rest of the samples having single-phase $Fe_2B$ solid layers.

Examples 31-38

A series of boriding powder compositions were prepared and tested as with Examples 14-22 above. The boriding compositions and results are shown in Table 3, where the sintering reduction agent (carbon black) is varied between 5.0 to 35.0 wt %, while the boron source and activator concentrations are held constant.

TABLE 3

| Example | 31 | 32 | 33 | 34 | 35 | 36 | 37 | 38 |
|---|---|---|---|---|---|---|---|---|
| $B_4C$, wt % | 2.5 | 2.5 | 2.5 | 2.5 | 2.5 | 2.5 | 2.5 | 2.5 |
| $KBF_4$, wt % | 5.0 | 5.0 | 5.0 | 5.0 | 5.0 | 5.0 | 5.0 | 5.0 |
| Carbon Black, wt % | 5.0 | 10.0 | 12.0 | 18.0 | 22.0 | 25.0 | 30.0 | 35.0 |
| Silicon Carbide, wt % | 87.5 | 82.5 | 80.5 | 74.5 | 70.5 | 67.5 | 62.5 | 57.5 |
| Sintering | yes | no | no | no | no | no | no | no |
| Boride Layer Thickness, inch | 0.010 | 0.010 | 0.010 | 0.009 | 0.010 | 0.006 | 0.006 | 0.005 |
| Boride Layer Quality* | (2) | (2) | (2) | (2) | (2) | (2) | (2) | (2) |

*(1) incomplete at surface
(2) single-phase $Fe_2B$ solid layer
(3) mostly single-phase $Fe_2B$ solid layer, some FeB at surface
(4) highly porous and incomplete layer The results of Table 3 indicate that Example 31, containing the lowest level of sintering reduction agent (5.0 wt %) results in sintering. All of the samples provided boride layers having single-phase, $Fe_2B$ layers. However, Examples 36-38, corresponding to levels of anti-sintering agent of 25.0 to 35.0 wt % result in lower boride layer thickness. Without wishing to be bound by theory, Applicants believe that one possible explanation is that the lower thermal conductivity (higher carbon black content) powders took a longer time to reach the 1750° F. boriding temperature during the test, and started boriding later than the lower carbon black concentration examples. Another possible explanation is that the low density of the carbon black causes a fixed mass of carbon to take up significantly more volume than silicon carbide, and that this resulted in diluting the boron carbide and KBF4 concentrations.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process comprising:
    placing a boronizing powder composition in the interior of a metal pipe comprising a first end, a second end, an inside surface and an outside surface;
    heating the pipe in a vessel having an interior, to a boriding temperature, thereby forming spent boronizing reaction gases and a borided layer on the inside surface,
    wherein the vessel interior has an air atmosphere that surrounds the outside surface of the metal pipe; and
    flowing the spent boronizing reaction gases from the interior of the pipe into the air atmosphere surrounding the outside surface of the pipe, thereby forming an oxygen-depleted atmosphere having an oxygen level of less than 5.0 vol% based on the total of the oxygen-depleted atmosphere, the reaction gases being selected from at least one of hydrofluoric acid, fluorine, hydrochloric acid, chlorine, $BF_3$, $BCl_3$, KF, NaF, or mixtures thereof.

2. The process of claim 1 wherein the spent boronizing reaction gases exit the end of the pipe and flow into the atmosphere surrounding the vessel.

3. The process of claim 1 wherein a first portion of the spent boronizing reaction gases exit the end of the pipe and flow into the atmosphere surrounding the vessel, and a second portion flows to a reaction chamber.

4. The process of claim 1 further comprising feeding a gas to the vessel interior for purging oxygen from the vessel.

5. The process of claim 1 further comprising flowing the oxygen-depleted atmosphere stream from the vessel to a reaction chamber.

6. The process of claim 4 wherein the gas is selected from helium, argon, nitrogen, endothermic gas, exothermic gas or mixtures thereof.

7. The process of claim 1 wherein the metal of the metal pipe comprises plain carbon steel, alloy steel, tool steel, stainless steel, nickel-based alloys, cobalt-based alloys, cast iron, ductile iron, molybdenum, or stellite.

8. The process of claim 1 wherein the borided layer thickness is from 0.0005 to 0.020 inches.

9. The process of claim 8 wherein the borided layer thickness is from 0.002 to 0.015 inches.

10. The process of claim 1 wherein the borided layer comprises 80.0 to 100.0 vol % $Fe_2B$ and 0 to 20.0 vol % FeB, based on the total amount of $Fe_2B$ and FeB.

11. The process of claim 10 wherein the borided layer comprises 95.0 to 100.0 vol % $Fe_2B$ and 0 to 5.0 vol % FeB, based on the total amount of $Fe_2B$ and FeB.

12. The process of claim 5 wherein the reaction chamber is an absorption bed.

13. The process of claim 1 wherein the vessel is a furnace.

14. The process of claim 5 wherein the reaction chamber is positioned within the furnace.

15. The process of claim 5 wherein the reaction chamber is a scrubber.

16. The process of claim 12 wherein the spent boronizing reaction gases are contacted with absorbent material in the adsorption bed.

17. The process of claim 16 wherein the adsorbent material is selected from solid $Ca(OH)_2$, CaO, $CaCO_3$, soda glass, blast furnace slag, portland cement, sodium hydroxide, soda lime, sodium bicarbonate, limestone, alumina, or mixtures thereof.

18. The process of claim 15 wherein the spent boronizing reaction gases are contacted with water, aqueous solutions of $Ca(OH)_2$, CaO, blast furnace slag, portland cement, alumina, soda glass, sodium hydroxide, soda lime, $CaCO_3$ or mixtures thereof in the scrubber.

19. The process of claim 1 wherein the boronizing powder composition comprises: 0.5 to 25.0 wt % of a boron source selected from $B_4C$, amorphous boron, calcium hexaboride, borax or mixtures thereof; 1.0 to 25.0 wt % of an activator selected from $KBF_4$, ammonia chloride, cryolite, sodium fluoride, ammonium bifluoride, potassium fluoride, calcium fluoride, or mixtures thereof; and 50.0 to 98.5 wt % of a diluent selected from SiC, alumina or mixtures thereof, based on the total weight of the boron source, activator and diluent.

20. The process of claim 1 wherein the boronizing powder composition comprises: 2.0 to 4.0 wt % of a boron source selected from $B_4C$, amorphous boron, calcium hexoboride, Borax or mixtures thereof; 2.5 to 10.0 wt % of an activator selected from $KBf_4$, ammonia chloride, cryolite, sodium fluoride, ammonium bifluoride, potassium fluoride, calcium fluoride, or mixture thereof; 61.0 to 83.5 wt % of a diluent selected from SiC, alumina or mixtures thereof; and 12.0 to 25.0 wt % of a sintering reduction agent selected carbon black, graphite or mixture thereof, based on the total weight of the boron source, activator, diluent, and sintering reduction agent.

21. The process of claim 20 wherein the boronizing powder composition comprises 2.0 to 3.0 wt % of the boron source; 4.0 to 6.0 wt % of the activator; 18.0 to 22.0 of the sintering reduction agent and 69.0 to 76.0 wt % of the diluent, based on the total weight of the boron source, activator, sintering reduction agent and diluent.

22. The process of claim 21 wherein the borided layer comprises 95.0 to 100.0 vol % $Fe_2B$ and 0 to 5.0 vol % FeB, a thickness of 0.0005 to 0.015 inches, a variabillity of the thickness of the boride layer of no greater than 0.005", and a porosity of less than 5%.

23. A process comprising:
placing a boronizing powder composition comprising 2.0 to 4.0 wt % of a boron source selected from $B_4C$, amorphous boron, calcium hexaboride, Borax or mixtures thereof; 2.5 to 10.0 wt % of an activator selected from $KBF_4$, ammonia chloride, cryolite, sodium fluoride, ammonium bifluoride, potassium fluoride, calcium fluoride, or mixtures thereof; 61.0 to 83.5 wt % of a diluent selected from SiC, alumina or mixtures thereof; and 12.0 to 25.0 wt % of a sintering reduction agent selected carbon black, graphite or mixtures thereof, based on the total weight of the boron source, activator, diluent, and sintering reduction agent in the interior of a metal pipe comprising a first end, a second end, an inside surface and an outside surface;
heating the pipe in a vessel having an interior, to a boriding temperature, thereby forming spent boronizing reaction gases selected from at least one of hydrofluoric acid, fluorine, hydrochloric acid, chlorine, $BF_3$, $BCI_3$, KF, NaF, or mixtures thereof, and a borided layer on the inside surface; and
flowing the spent boronizing reaction gases from the interior of the metal pipe into a reaction chamber, wherein the reactor chamber is positioned inside or outside the furnace.

24. The process of claim 23 wherein the pipe is heated in a furnace.

25. The process of claim 23 wherein the reaction chamber is positioned inside the furnace.

26. The process of claim 23 wherein the reaction chamber is positioned outside the furnace.

27. A process comprising:
placing a boronizing powder composition in the interior of a metal pipe comprising a first end, a second end, an inside surface and an outside surface;
heating the pipe in a vessel having an interior, to a temperature from 1400° F. to 1900° F., thereby forming spent boronizing reaction gases and a borided layer on the inside surface, the interior of the vessel having an air atmosphere, and the reaction gases being selected from at least one of hydrofluoric acid, fluorine, hydrochloric acid, chlorine, $BF_3$,$BCI_3$, KF, NaF, or mixtures thereof,
wherein the air atmosphere of the vessel surrounds the outside surface of the metal pipe;
flowing the spent boronizing reaction gases into the air atmosphere surrounding the outside surface of the pipe, thereby forming an oxygen-depleted atmosphere stream having an oxygen level of less than 5.0 vol %; and
flowing the oxygen-depleted atmosphere stream to a reaction chamber.

28. The process of claim 27 wherein the pipe is heated in a furnace.

29. The process of claim 27 wherein the reaction chamber is positioned inside the furnace.

30. The process of claim 27 wherein the reaction chamber is positioned outside the furnace.

31. A process comprising:
placing boronizing powder comprising 2.0 to 4.0 wt % of a boron source selected from $B_4C$, amorphous boron, calcium hexaboride, Borax or mixtures thereof; 2.5 to 10.0 wt % of an activator selected from $KBF_4$, ammonia chloride, cryolite, sodium fluoride, ammonium bifluoride, potassium fluoride, calcium fluoride, or mixtures thereof; 61.0 to 83.5 wt % of a diluent selected from SiC, alumina or mixtures thereof;
and 12.0 to 25.0 wt % of a sintering reduction agent selected carbon black, graphite or mixtures thereof, based on the total weight of the boron source, activator, diluent, and sintering reduction agent and a metal workpiece in a first container;
boronizing the metal workpiece in a furnace, thereby forming spent boronizing gases; and
flowing the spent boronizing gases through absorbent material selected from solid $Ca(OH)_2$, CaO, $CaCO_3$, soda glass, blast furnace slag, Portland cement, sodium hydroxide, soda lime, sodium bicarbonate, limestone, alumina, or mixtures thereof prior to release into the furnace or the environment.

32. The process of claim 31 where the first container comprises a sand seal, and is positioned inside a second container, where the second container is larger than the first container and wherein at least the sand seal is submerged in absorbent material, so that any spent boronizing gases leaking through the sand seal contacts the absorbent material prior to exiting the second container.

33. The process of claim 32 wherein the first container is entirely submerged in the absorbent material so that the spent boronizing reaction gases pass through the absorbent material prior to exiting the second container.

34. The process of claim 31 where the first container comprises an open top pot or a pan comprising a mesh screen basket positioned on top of the first container where spent boronizing reaction gases pass through the bottom of the mesh screen basket to exit the boronizing container where it passes through and reacts with the absorbent material before exiting the first container.

35. The process of claim 31 where the first container comprises a first chamber for housing the metal workpiece and boronizing powder, and a second chamber for housing the absorbent material, wherein the spent boronizing reaction gases pass from the first chamber to the second chamber prior to exiting the first container.

36. The process of claim 31 wherein the first container comprises a lower boronizing compartment, an upper reaction chamber and a porous or solid separation barrier, wherein the lower boronizing compartment is an open top box pot or pan for housing boronizing powder and workpieces, the porous or solid barrier layer is selected from a heat and chemical resistant plate foil, ceramic fiber blanket, or combinations thereof, positioned between the lower boronizing compartment and the upper reaction chamber, and the upper reaction chamber, positioned above the barrier layer, houses absorbent material wherein spent boronizing reaction gases flow from the lower boronizing compartment, through the porous barrier or around a solid barrier layer and into the upper reaction chamber.

37. The process of claim 32 wherein the second container is sand sealed, and boronizing reaction gases flow to a reaction chamber filled with absorbent material positioned either inside or outside of the furnace, and spent boronizing reaction gases flow through the reaction chamber prior to release.

38. The process of claim 31 where the first container is the workpiece comprising open end(s), and only the interior surfaces of the workpiece is contacted with boronizing powder, and where spent boronizing reaction gases flow to a reaction chamber containing absorbent material before exiting the reaction chamber.

39. The process of claim 38 where the open end(s) of the workpiece is filled with a layer of absorbent material such that spent boronizing reaction gases flow through the layer prior to exiting the workpiece.

* * * * *